(12) United States Patent
Dowd

(10) Patent No.: US 9,619,108 B2
(45) Date of Patent: Apr. 11, 2017

(54) COMPUTER-IMPLEMENTED SYSTEMS AND METHODS PROVIDING USER INTERFACE FEATURES FOR EDITING MULTI-LAYER IMAGES

(75) Inventor: Geoffrey Dowd, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 382 days.

(21) Appl. No.: 13/006,738

(22) Filed: Jan. 14, 2011

(65) Prior Publication Data

US 2012/0185768 A1 Jul. 19, 2012

(51) Int. Cl.
*G06F 3/048* (2013.01)
*G06F 3/0482* (2013.01)
*G06F 3/0488* (2013.01)
*G06F 3/0481* (2013.01)

(52) U.S. Cl.
CPC .......... *G06F 3/0482* (2013.01); *G06F 3/0481* (2013.01); *G06F 3/0488* (2013.01); *G06F 2203/04801* (2013.01); *G06F 2203/04804* (2013.01); *G06F 2203/04808* (2013.01)

(58) Field of Classification Search
CPC ....... H01L 2924/00; H01L 2224/45015; H01L 2224/45144; H01L 2224/48227; H01L 2224/48465; H01L 2924/1305; H01L 2924/1306; H01L 2924/00014; H01L 21/8252; H01L 2223/6611; H01L 2223/6644; H01L 2223/665

USPC ......................................... 715/763, 767, 784
See application file for complete search history.

(56) References Cited

U.S. PATENT DOCUMENTS

| | | | |
|---|---|---|---|
| 2009/0037433 A1* | 2/2009 | Nakamura et al. | 707/10 |
| 2009/0146961 A1* | 6/2009 | Cheung et al. | 345/172 |
| 2010/0125814 A1* | 5/2010 | Lemons | 715/853 |
| 2010/0138763 A1* | 6/2010 | Kim | 715/765 |

OTHER PUBLICATIONS

Gimp, Chapter 8. Combining Images (Jul. 27, 2007).*
Donald Bell, Galaxy Tab Sprint Review (Nov. 14, 2010).*
Matt Doyle, Photoshop CS3 Layers Bible (Oct. 29, 2007).*
Willard, Wendy, "Photoshop 7 Tips & Techniques", ISBN: 0-07-222446-0, The McGraw-Hill Companies, 2002, 2 pages.

* cited by examiner

*Primary Examiner* — Di Xiao
(74) *Attorney, Agent, or Firm* — Kilpatrick Townsend & Stockton LLP

(57) ABSTRACT

One exemplary embodiment involves, on a computer device, displaying a graphical user interface for editing electronic content and displaying representations of a fixed number of layers available for use in the electronic content. Representation of ones of the layers that are not used are graphically distinguished from representations of ones of the layers that are used. In response to receiving input at the computer device, an editing feature for editing a layer of the electronic content is provided.

19 Claims, 27 Drawing Sheets

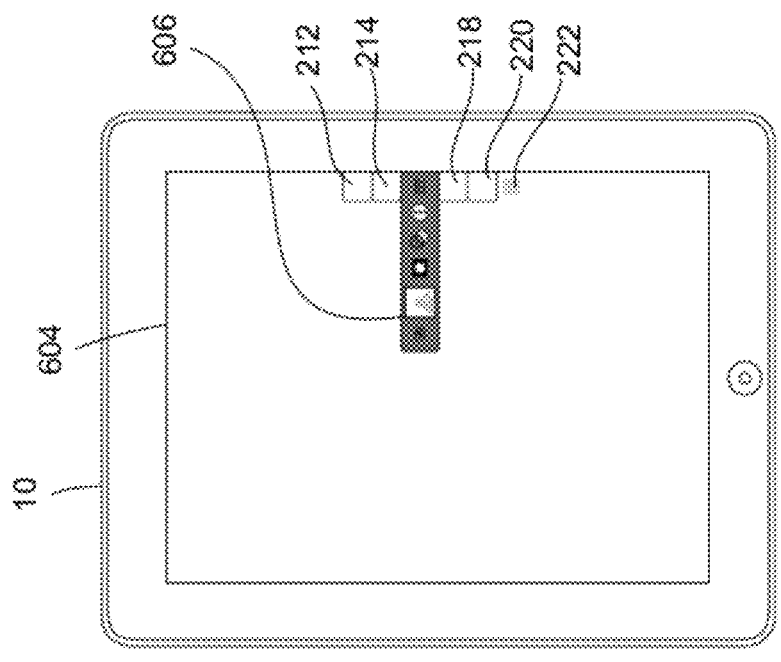
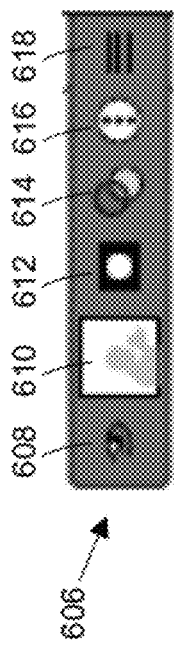
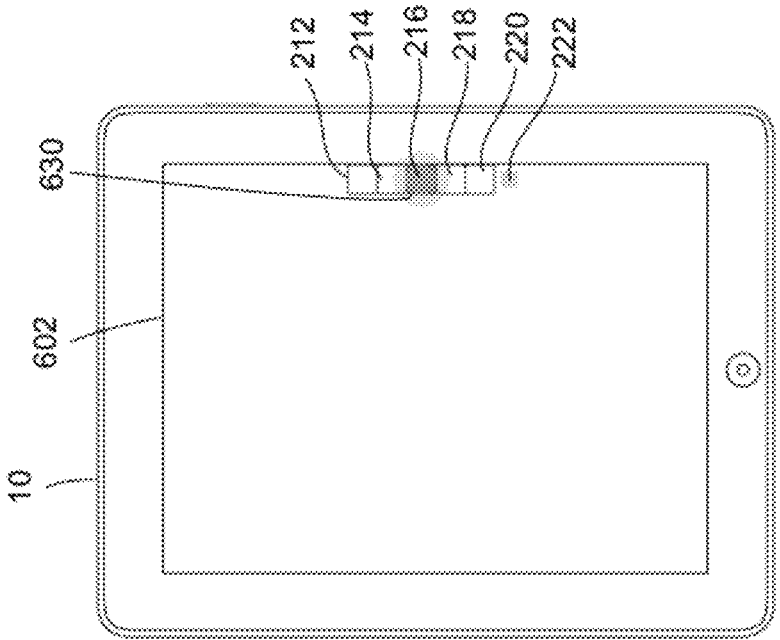
FIGURE 6A
FIGURE 6B

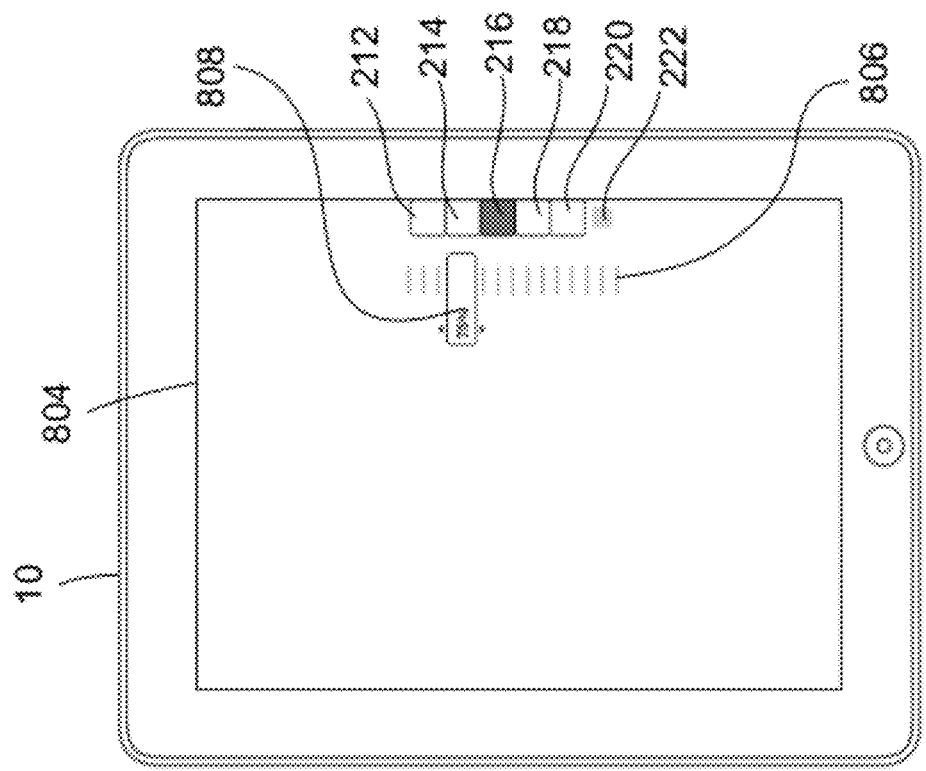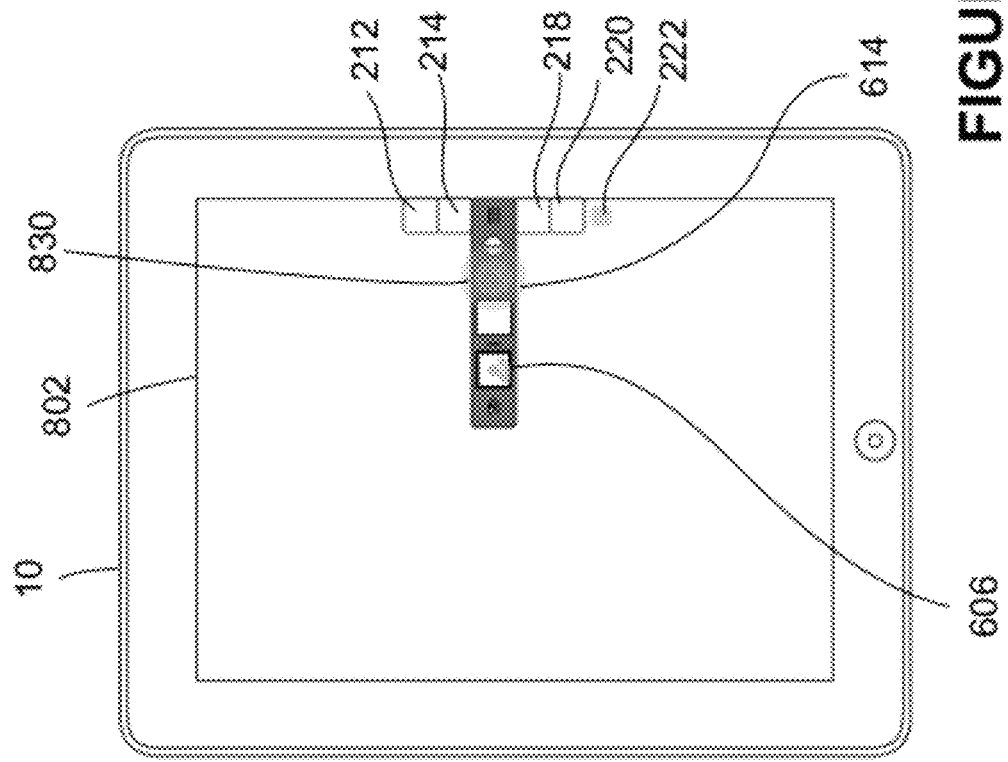
FIGURE 8

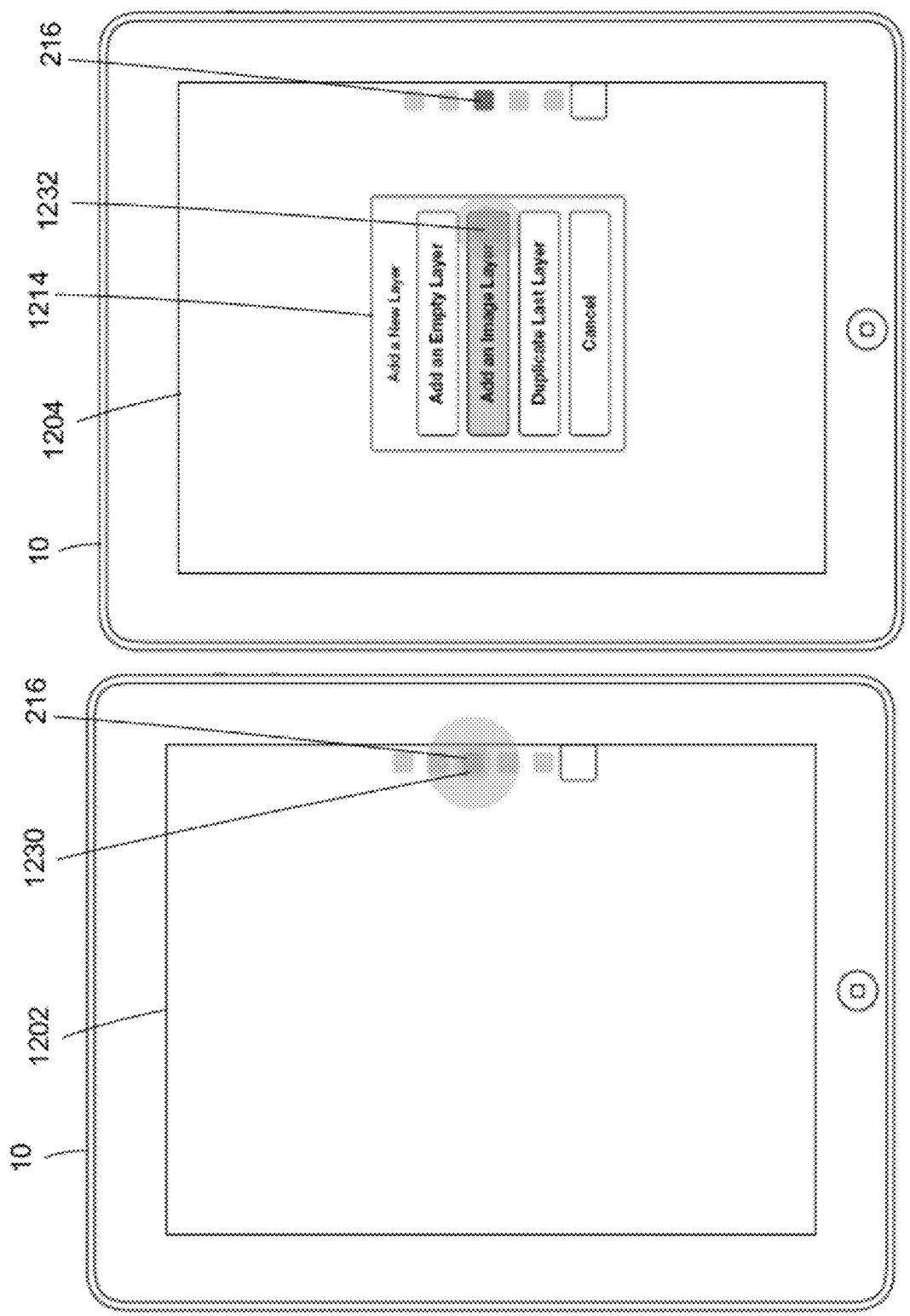

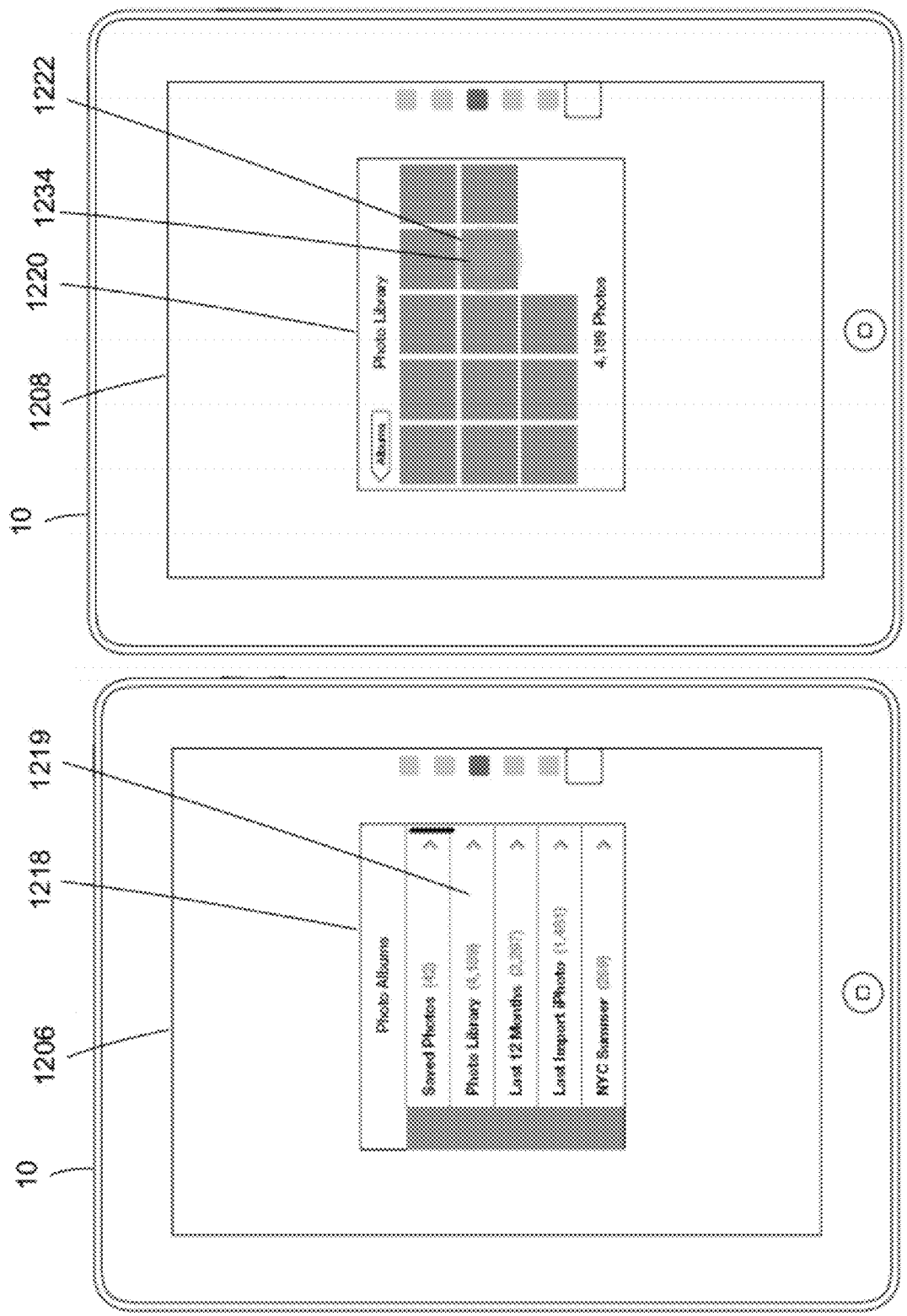

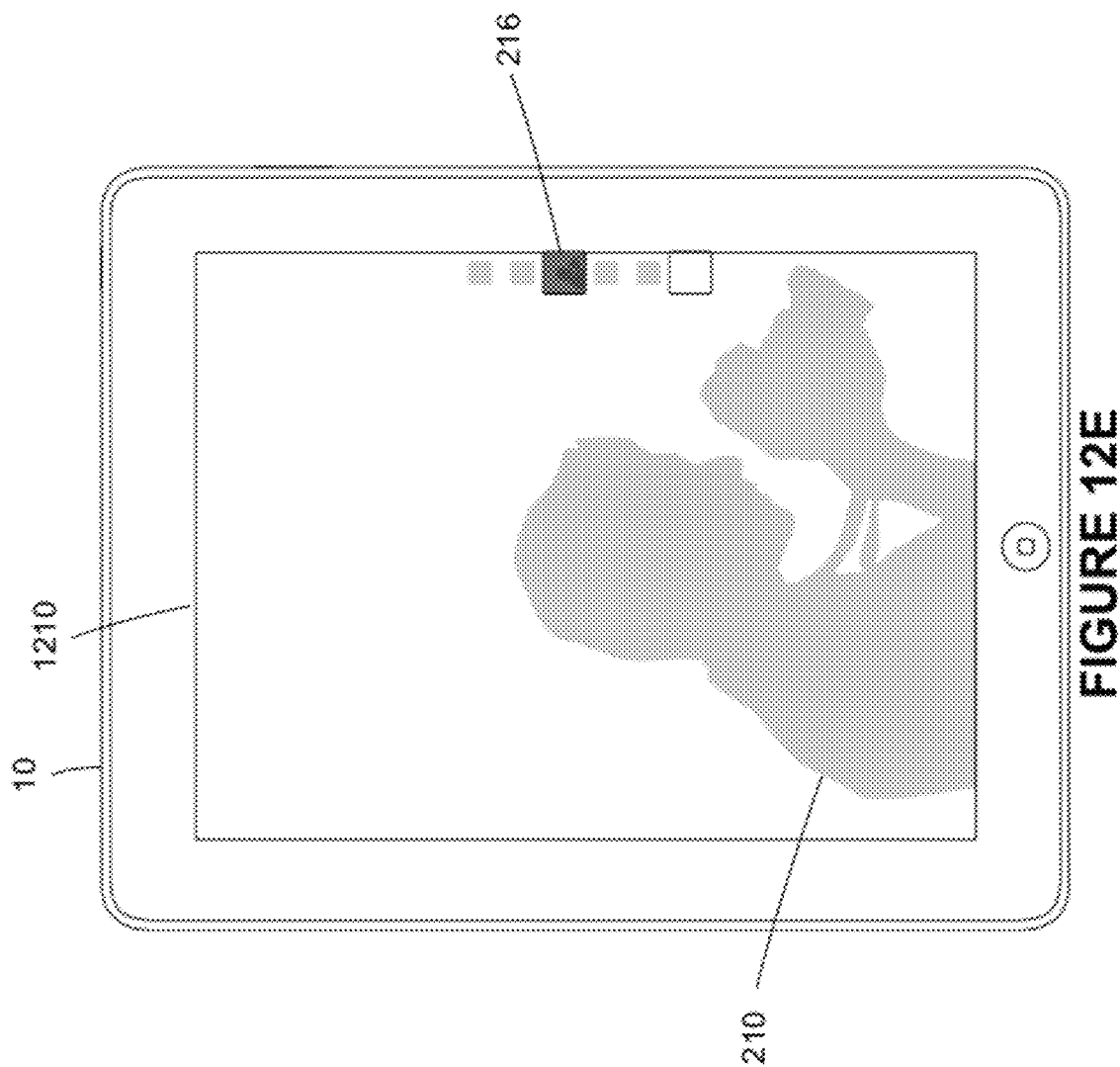

2600

```
┌─────────────────────────────────────────┐
│   DISPLAY GRAPHICAL USER INTERFACE FOR  │
│        EDITING ELECTRONIC CONTENT       │
│                                   2610  │
└─────────────────────────────────────────┘
                    │
                    ▼
┌─────────────────────────────────────────┐
│   DISPLAY REPRESENTATIONS OF A FIXED    │
│   NUMBER OF LAYERS AVAILABLE FOR USE IN │
│         THE ELECTRONIC CONTENT          │
│                                   2620  │
└─────────────────────────────────────────┘
                    │
                    ▼
┌─────────────────────────────────────────┐
│  IN RESPONSE TO RECEIVING INPUT, PROVIDING │
│  AN EDITING FEATURE FOR EDITING A LAYER OF │
│         THE ELECTRONIC CONTENT          │
│                                   2630  │
└─────────────────────────────────────────┘
```

FIGURE 26

COMPUTER-IMPLEMENTED SYSTEMS AND METHODS PROVIDING USER INTERFACE FEATURES FOR EDITING MULTI-LAYER IMAGES

FIELD

This disclosure relates generally to computer software and more particularly relates to photo manipulation and other electronic content editing software applications, and more particularly relates to the use of layers and other features provided by such applications.

BACKGROUND

Various photo manipulation and other electronic content editing software applications are available for desktop computers and other electronic devices. Such applications are used to make adjustment to photographs and other digital images, create web designs and artwork, and for various other purposes. Layers are used in digital image editing to separate different elements of an image. A layer can be compared to a transparency on which imaging effects or images are applied and placed over or under other image layers. Layers provide a convenient way to separately work on different aspects of an image by allowing a user to edit individual layers of the image independently. Layers can be used like stacked transparent sheets on which a user can create images and effects, where layers have transparent or semi-transparent areas that allow portions of lower layers to be visible. Layers can be provided in different types, e.g., as object layers, bitmap layers, and vector layers.

Many desktop-targeted editing applications can have virtually an unlimited number of layers for a single image or piece of electronic content, since desktop processing and user interface constraints generally impose few restrictions on the use of layers. In contrast, tablet computing devices, mobile phones, and other devices generally have more limited processing power, memory, screen size, input components, and/or other attributes that limit the use of layers an other editing features on such devices. Using layers on such devices is generally limited and cumbersome. Editing applications for such devices do not adequately provide robust tools and user interface functionality that accounts for the limitations of the such devices. Such applications also require significant user interaction with menus and other user interface features that can make using the applications time-consuming and otherwise difficult.

SUMMARY

One exemplary embodiment involves, on a computer device, displaying a graphical user interface for editing electronic content and displaying representations of a fixed number of layers available for use in the electronic content. Representation of ones of the layers that are not used are graphically distinguished from representations of ones of the layers that are used. In response to receiving input at the computer device, an editing feature for editing a layer of the digital image is provided. These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIGS. 6A-B illustrate accessing an expanded layer editing menu;

FIG. 8 illustrates a series of screen shots illustrating use of an opacity feature;

FIGS. 12A-E illustrates a series of screen shots illustrating creation of a new photograph layer;

FIG. 26 is a flow chart illustrating an exemplary method of providing an editing feature for editing a layer of the digital image.

DETAILED DESCRIPTION

Figure 1:
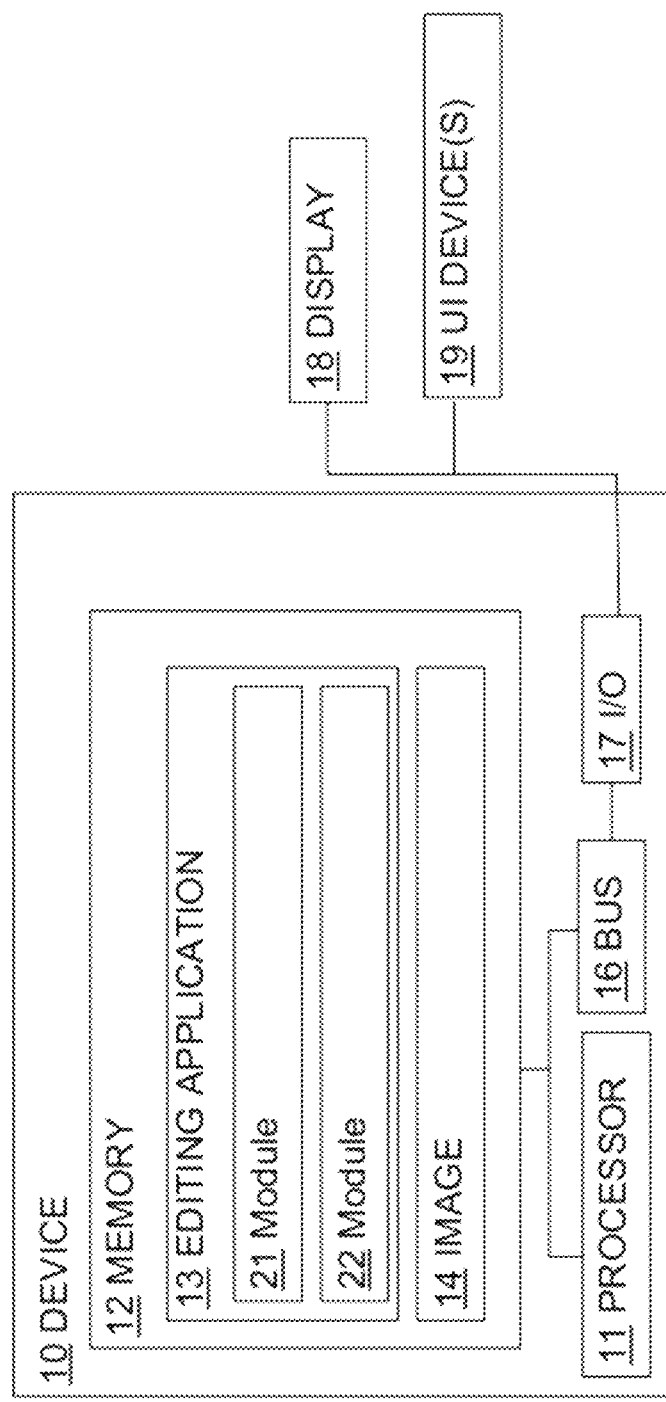
FIG. 1 is a block diagram depicting exemplary computing devices in an exemplary computing environment for implementing certain embodiments.

Improved systems and methods for providing features that allow a user to create, delete, manage, and edit and otherwise use multi-layer digital images and other electronic content. User interface features and functionality are provided that provide various benefits in editing applications used on computer devices with limited resources, such as tablet computing devices, but that may be implemented extensible in other computer devices that are not so limited. Similarly, User interface features and functionality are provided that provide various benefits in the context of computer devices having a touch screen as a primary or sole input mechanism, but may be implemented in other computing devices as well including in desktop applications that receive input through a mouse, stylus, or other input device.

One embodiment displays selectable thumbnail images and other representations of layers as principle means of allowing displaying layer information and receiving input regarding layers. Displaying only a thumbnail or other minimal information for layers can make such representations well suited for use on computing devices with limited screen sizes or other limitations. One embodiment, provides a vertical stack of representations of layers on a one side of the screen such that the stack does not objectionably obscure other content displayed, such as graphics, effects, or other aspects of electronic content displayed in a what-you-see-is-what-you-get (WYSIWYG) interface displayed adjacent to the stack. The individual representations in such a stack can provide information about the layers. For example, thumbnail images used as representations provide a miniature preview of the contents of a layer. Representations may also indicate whether or not a layer is empty or not. For example, in a stack of seven layer representations, three of the representations may provide thumbnail images of the respective layers and the other four representations may each provide an icon that indicates that those four layers are empty, i.e., are not being used. The total number of representations used may provide an indication of the total number of layers that are available. In the preceding example, the seven representations indicate that there are only seven layers available, while only three of the seven are currently being used.

An editing application user interface may be configured to allow a user to manage layers in various ways. Layer editing and management features can be provided using layer and feature representation that display core information but allow access to additional information and functionality through intelligently-configured user-input techniques. For example, touch-screen gestures can be defined so that additional information and features can be accessed and used with intuitive gestures while reducing or minimizing the amount of screen space required for menus and options. For example, a single tap on a layer thumbnail may select the layer, a double tap may open the layer for editing in a WYSIWYG editor, a drag across to the left may delete the layer, holding and dragging a layer to a new relative position in a stack of layers can be used to reorder the layers, and holding and dragging a layer onto another layer may cause the layer to merge with the layer upon which it is dragged, etc.

Expanded information and features can be accessed by intuitive gestures that provide additional icons and other feature representations that are themselves provided to show only core or minimal information and/or to be used via gestures in different way. For example, a gesture relative to layer representation may cause a menu of layer editing tool features icons to be displayed and a subsequent gesture relative to an opacity feature icon can initiate use of the opacity feature for the layer. Other exemplary layer editing features include masking, opacity, blending modes, etc.

Embodiments presented herein provide different and numerous advantages. Providing simple user interface elements that occupy limited screen space facilitates the provision of more sophisticated and easier to use layer features and functionality. Layer representations can be small and remain visible to encourage use of and understanding of the layers. Similarly, graphically providing information about the limitations on the use of layers, such an indication that only seven layers are available, can avoid user frustration by allowing users to recognize the limitations of the application. Limiting the use of labels and extraneous information can make the use of an editing application easier, more intuitive, and otherwise more approachable. Similarly, allowing a user to view, interact with, create, delete, move, and otherwise edit layers using touch-input gestures can simplify use, avoid distraction, and encourage creativity.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting exemplary computing devices in an exemplary computing environment for implementing certain embodiments. Applications and other electronic content executes or is otherwise used on the exemplary computer device 10 and are shown as functional components or modules. As is known to one of skill in the art, such applications and content may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Objective-C, Visual Basic, Java, Python, Perl, JavaScript, and ActionScript.

The device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other types of electronic devices appropriate for providing one or more of the features described herein. In one exemplary embodiment, device 10 is a touch-screen device such as a tablet or touch-screen mobile phone. In one exemplary embodiment, a diagonally-measured screen size of such a touch screen is within a range of 5 inches to 9 inches, inclusive.

FIG. 1 illustrates an exemplary device 10 that comprises, in memory 12, an editing application 13 for editing of electronic content 14. Electronic content includes, but is not limited to, electronic documents, text, images, graphics, web pages, applications, and rich Internet applications. An exemplary system could comprise a touch screen to provide display 18 and a UI device 19 and include a processor 11 for executing instructions stored in computer-readable medium on one or more devices such as device 10 to provide an application for editing electronic content such as editing application 13. Editing application 13 may itself comprise sub-modules. One exemplary sub-module is a module 21 for causing the touch screen to display representations of a fixed number of layers available for use in the electronic content. Representation of ones of the layers that are not used may be graphically distinguished from representations of ones of the layers that are used. Additionally, representations of the ones of the layers that are used may each display minimal information, for example, by only displaying a selectable thumbnail image representative of a corresponding layer of the electronic content. Representation of the ones of the layers that are not used may each display a selectable indicator indicating that a respective layer is not used. The module 21 may determine relative positions of the representations to indicate an order of the representations. The vertical placement of each representation relative to other representations may indicate the position of its associated layer in such an order. For example, a representation of a first layer positioned above a representation of a second layer indicates that the first layer is above the second layer in the electronic content. The relative positioning of the layers indicates which of the layers obscure which other layers. Thus, as an example, a first layer being above a second layer means that potentially some portion of the first layer includes graphic, image or other data that obscures a corresponding portion of the second layer.

Another exemplary sub-module is a module 22 for responding to input received via the touch screen to provide an editing feature for editing a layer of the electronic content. In one exemplary embodiment, the module 22 is configured to receive the touch-based input as a gesture that selects a first representation representing a first layer and moves it to a new location relative to a second representation of a second layer. In response to receiving the input, the module 22 may merge the first layer into the second layer and change the first representation to indicate that the first layer is not used.

Figure 2:
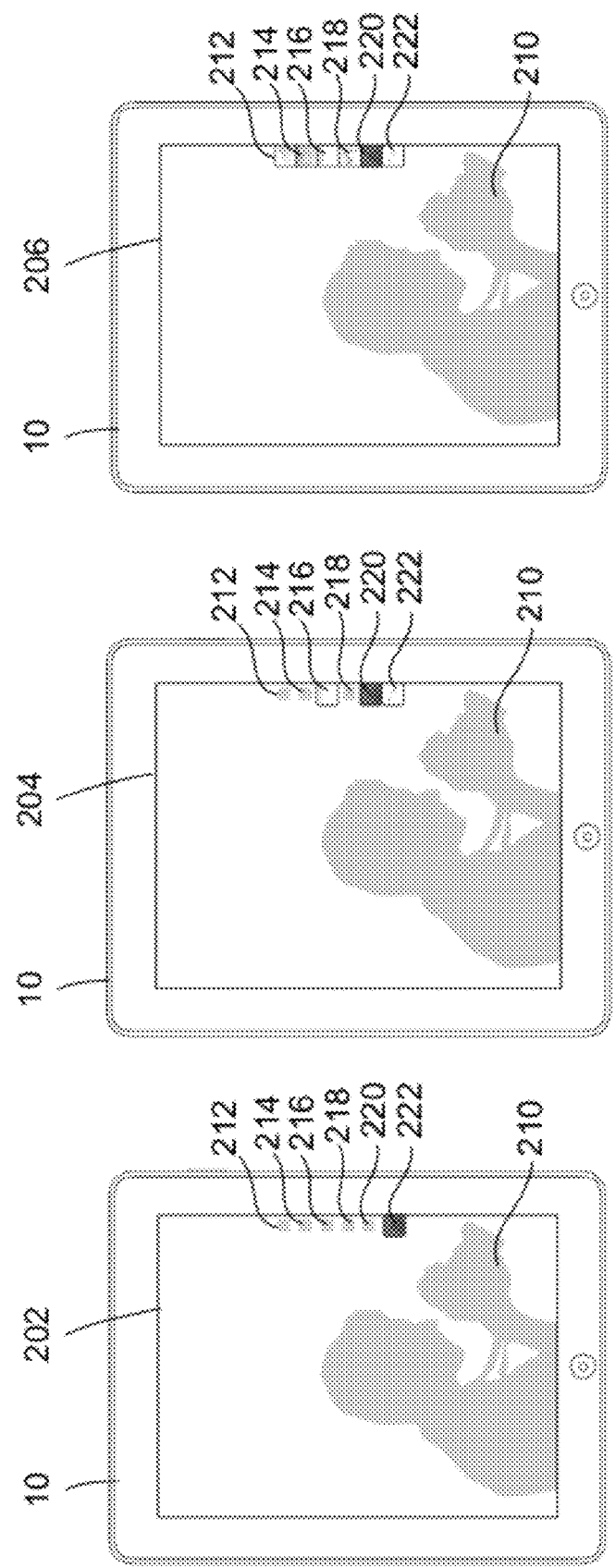
FIG. 2 illustrates a series of screen shots illustrating representations of layers that are used and representations of layers that are not used.

FIG. 2 illustrates a series of screen shots 202, 204, 206 on exemplary device 10 illustrating representations of layers that are used and representations of layers that are not used. Representations 212, 214, 216, 218, 220, 222 represent the six layers that are available. Thus, because the number or representations of layers used and not used is fixed, the display graphically and intuitively shows that there is a limited number of layers available. In this example, layers currently being used are represented by only an image thumbnail of the corresponding layer. Non-layers, or layers that are not yet used, are represented with targets, which in this example are small squares. Such exemplary targets may be smaller than, the same size as, or larger than representations of layers that are being used. The representations 212, 214, 216, 218, 220, 222 of layers are small in size and configured so that they can be presented without significantly obscuring the image 210 or image layer that is being edited on the device 10. The order of the representations 212, 214, 216, 218, 220, 222 indicates the order of the represented layers. Thus, the layer represented by representation 212 is above the layer represented by representation 214, the layer represented by representation 214 is above the layer represented by representation 216, etc. In one embodiment, one, some, or all of the representations are presented outside of the image or electronic content editing area.

Screen shot 202 illustrates that only one of the six available layers is populated. Specifically, representation 222 displays a thumbnail image while the other layers 212, 214, 216, 218, 220 each display a target indicating that each of those other layers 212, 214, 216, 218, 220 is available but not currently being used. Such targets can be selected, for example, by a tap or other touch-screen gesture, to initiate populating a new layer. Screen shot 204 illustrates that new layers have been populated as illustrated by the change of representations 216 and 220 to provide thumbnails representing layers in place of the representations 216 and 220 showing targets indicating the layers to be available but not currently being used as previously shown in screen shot 202. Similarly, screen shot 206 illustrates that all six layers are used as shown by representations 212, 214, 216, 218, 220, 222 providing thumbnails.

A representation can provide a thumbnail or other feature that indicates that an associated layer is used by being graphically distinct from a representation or representation representing layers that are not being used. By providing a thumbnail, the representation further provides information about the actual content (image, image effect, etc.) of the layer. Such information may improve layer recognition or otherwise improve ease of use. If a thumbnail image is used, the thumbnail can, but need not, provide a miniature version of the entire contents of a layer, e.g., providing the entire bitmap of the layer. The image that is used for the thumbnail may instead, for example, provide only a portion of the layer that does not include unused portions of the layer. Such zooming or selective use of layer content in a thumbnail may be useful in circumstances in which a layer has small features or significant unused portions. Zooming or otherwise selectively choosing content for the thumbnail may improve layer recognition. In one exemplary embodiment, a layer is divided into quadrants or other portions and only portions that are used are used in the thumbnail for the layer representation.

Screen shots 202, 204, 206 further illustrate how the representation of layers can indicate which of the one or more layers is currently being worked on, for example, in a WYSIWYG interface that is also displayed. In screen shot 202, highlighting of the representation 222 indicates that the layer corresponding to that representation 222 is currently being edited. Similarly, in screen shots 204 and 206, highlighting of the representation 220 indicates that the layer corresponding to that representation 220 is currently being edited.

Figure 3:
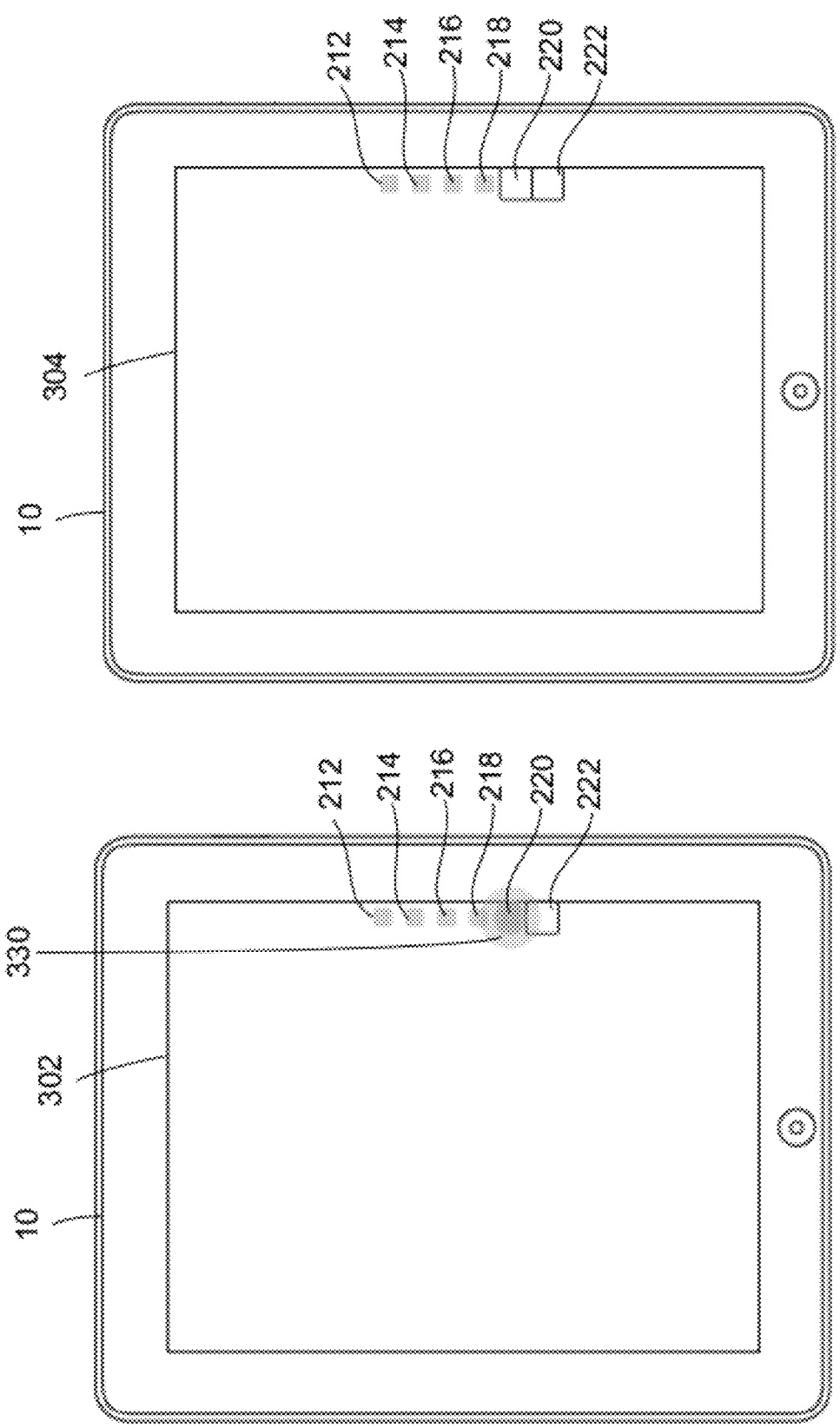
FIG. 3 illustrates a series of screen shots illustrating creation of a layer.

FIG. 3 illustrates a series of screen shots 302, 304 on exemplary device 10 illustrating creation of a layer. In this example, a single tap 330 on device 10 at the position of the representation 220 causes the creation of a new layer. In response to that input, a new layer is populated and the representation 220 changes from a target in screen shot 330 to represent that the layer associated with 220 is currently being used, as shown in screenshot 304. In this example, creation of a layer is accomplished by a single gesture. While creating a layer is controlled by a tap-type input in this example, other forms of touch-based and other types of input may alternatively or additionally be used.

Figure 4:
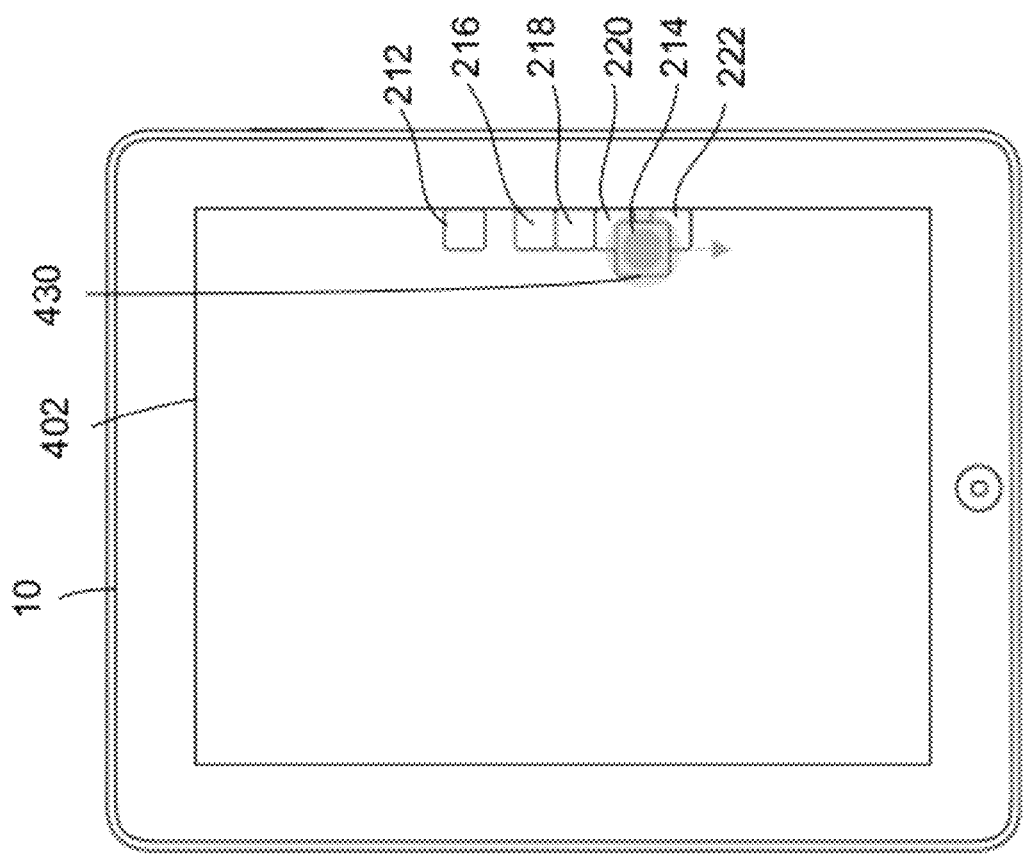
FIG. 4 illustrates a screen shot illustrating reordering of a layer.

FIG. 4 illustrates a screen shot 402 on exemplary device 10 illustrating reordering of a layer. In this example, a drag 330 on device 10 at the position of the representation 214 is used to drag the representation 214 down to cause the layers represented by representations 212, 214, 216, 218, 220, 222 to be reordered. At the release of the drag at the position shown in FIG. 4, the layer associated with representation 214 is reordered at the bottom of the layers represented by representations 212, 214, 216, 218, 220 and above the layer represented by representation 222. In this example, reordering of a layer is accomplished by a single gesture. While reordering layers is controlled by a drag-type input in this example, other forms of touch-based and other types of input may alternatively or additionally be used.

Figure 5:
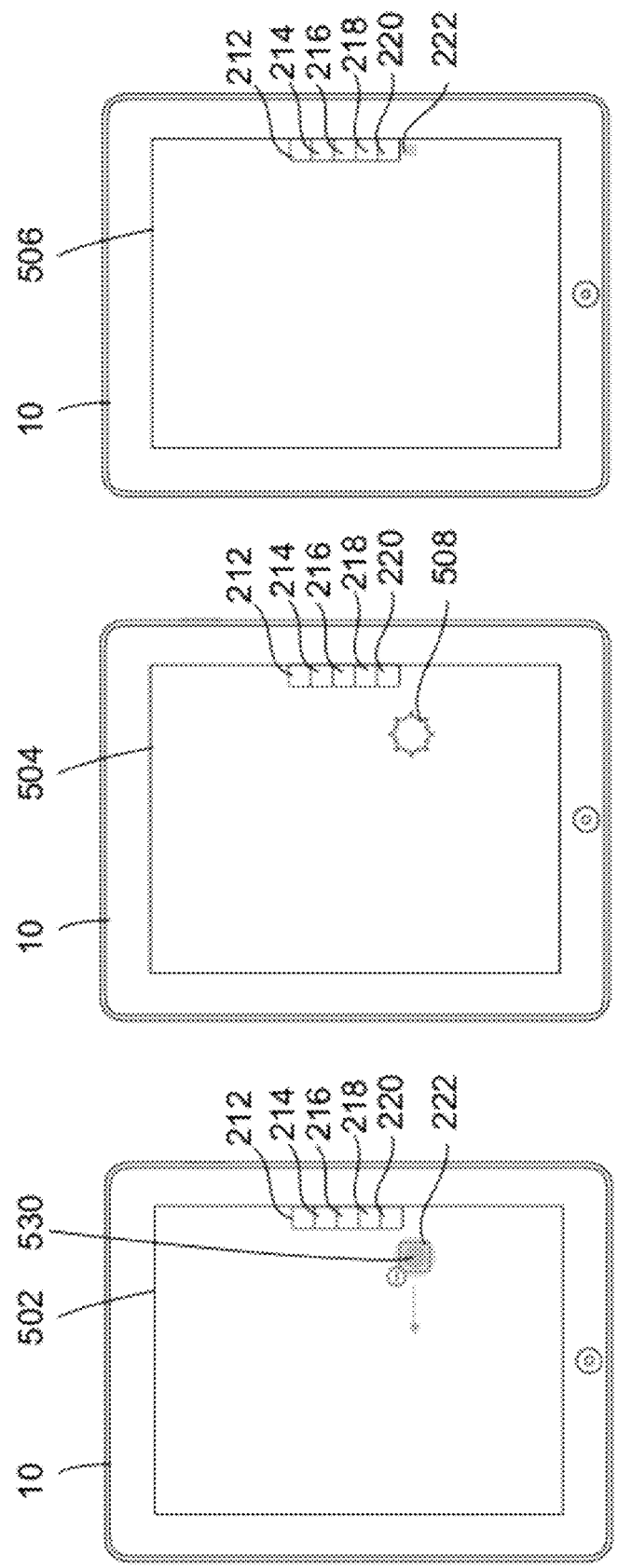
FIG. 5 illustrates a series of screen shots illustrating deletion of a layer.

FIG. 5 illustrates a series of screen shots 502, 504, 506 on exemplary device 10 illustrating deletion of a layer. In this example, in screenshot 502 a drag 530 on device 10 at the position of the representation 222 is used to drag the representation 222 away from the stack of the other representation 212, 214, 216, 218, 220. This results in a graphical indicator 508 indicating the deletion of the associated layer shown in screen shot 504 and the representation 222 changing as shown in screenshot 506 to represent that the layer associated with representation 222 is now not being used. In this example, deletion of a layer is accomplished by a single gesture. While deleting a layer is controlled by a drag-type input in this example, other forms of touch-based and other types of input may alternatively or additionally be used.

FIGS. 6A-B illustrate accessing an expanded layer editing menu 606. FIG. 6A illustrates a series of screen shots 602, 604 on exemplary device 10 and FIG. 6B illustrates a larger view of the expanded layer editing menu 606 of FIG. 6A. In this example, a single tap 630 on device 10 at the position of the already selected representation 216 as shown in screen shot 602 causes the expanded layer editing menu 606 to appear as shown in screen shot 604. As shown in FIG. 6B the expanded layer editing menu 606 includes an eyeball icon 608 for turning on and off a visibility feature, a thumbnail 610, a mask icon 612 for a mask feature used to link or unlink layer masks, an opacity icon 614 for adjusting the opacity of the layer, an effects icon 616 for controlling layer effects, and a gripper icon 618 for adjusting the expanded layer editing menu 606 to a new location. In this example, the expanded layer editing menu 606 menu is presented at a position shown in screen shot 604 that indicates the layer with which it is associated which, in this example, is the layer represented by representation 216. In this example, access to the expanded layer editing menu 606 is controlled by a single tap or double tap gesture. While such input is used in this example, other forms of touch-based and other types of input may alternatively or additionally be used.

Figure 7:
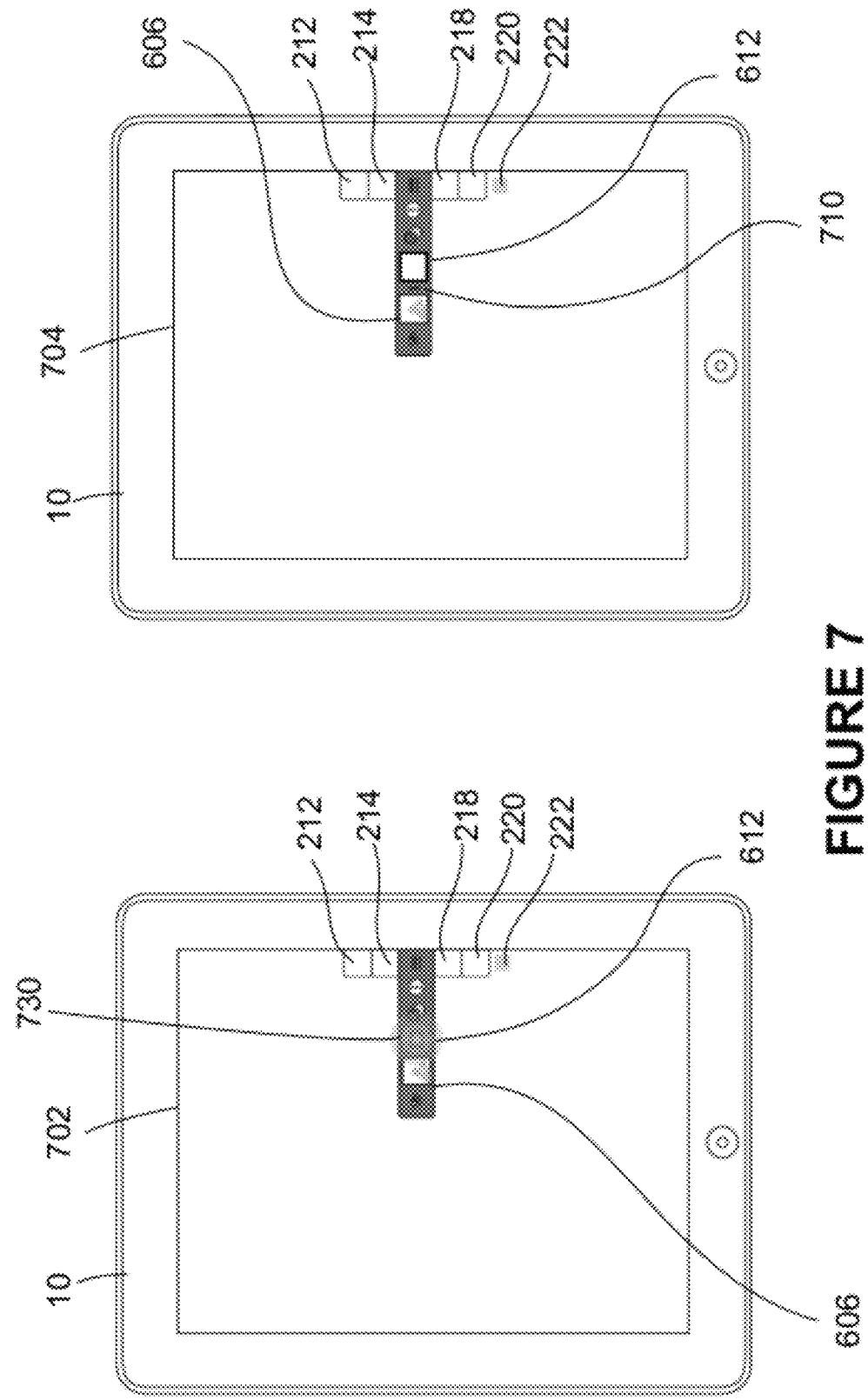
FIG. 7 illustrates a series of screen shots illustrating use of a mask feature.

FIG. 7 illustrates a series of screen shots 702, 704 on exemplary device 10 illustrating use of a mask feature. In this example, a single tap 730 on device 10 at the position of the mask icon 612 as shown in screen shot 702. A mask is added and linked and the mask icon 612 changes to indicate that the mask has been added and a link icon 710 is added to the expanded layer editing menu 606 to indicate that it is linked. In this example, use of the mask feature is controlled by a single tap gesture. While such input is used in this example, other forms of touch-based and other types of input may alternatively or additionally be used.

FIG. 8 illustrates a series of screen shots 802, 804 on exemplary device 10 illustrating use of an opacity feature. In this example, a single tap 830 on device 10 at the position of the opacity icon 614 is shown in screen shot 802. In response, an opacity scale 806 is displayed with an opacity adjustment slider 808 as shown in screen shot 804. In this example, use of the opacity feature is controlled by a single tap gesture. While such input is used in this example, other forms of touch-based and other types of input may alternatively or additionally be used.

Figure 9:
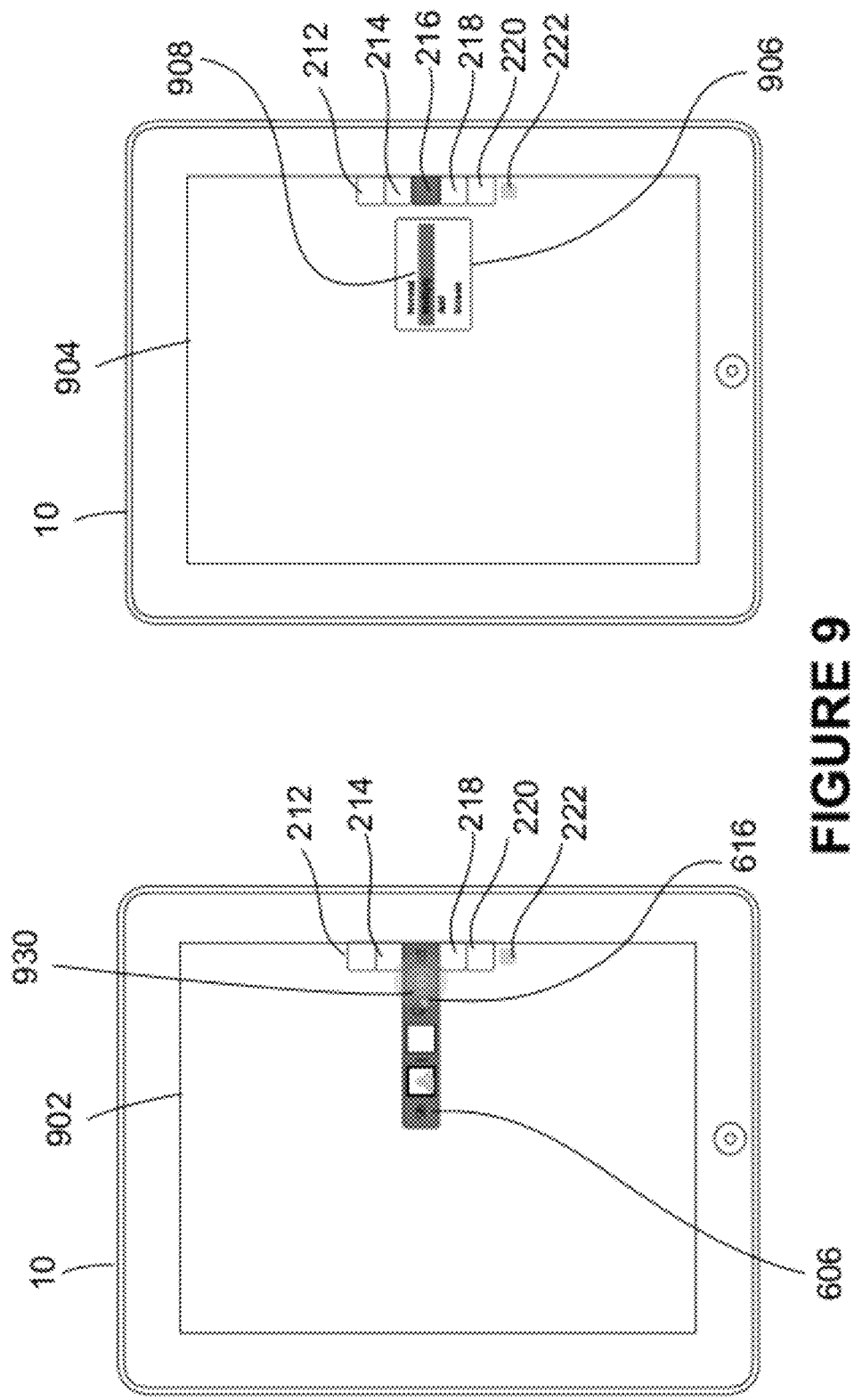
FIG. 9 illustrates a series of screen shots illustrating use of an layer effects feature.

FIG. 9 illustrates a series of screen shots 902, 904 on exemplary device 10 illustrating use of an layer effects feature. In this example, a single tap 930 on device 10 at the position of the effects icon 616 is shown in screen shot 902. In response, an effects menu 906 is displayed with selectable features for selecting NORMAL, MUTLIPLE, ADD, and SCREEN effects with the MULTIPLY effect selectable feature 908 highlighted, as shown in screen shot 904. In this example, use of the effects feature is controlled by a single tap gesture. While such input is used in this example, other forms of touch-based and other types of input may alternatively or additionally be used.

Figure 10:
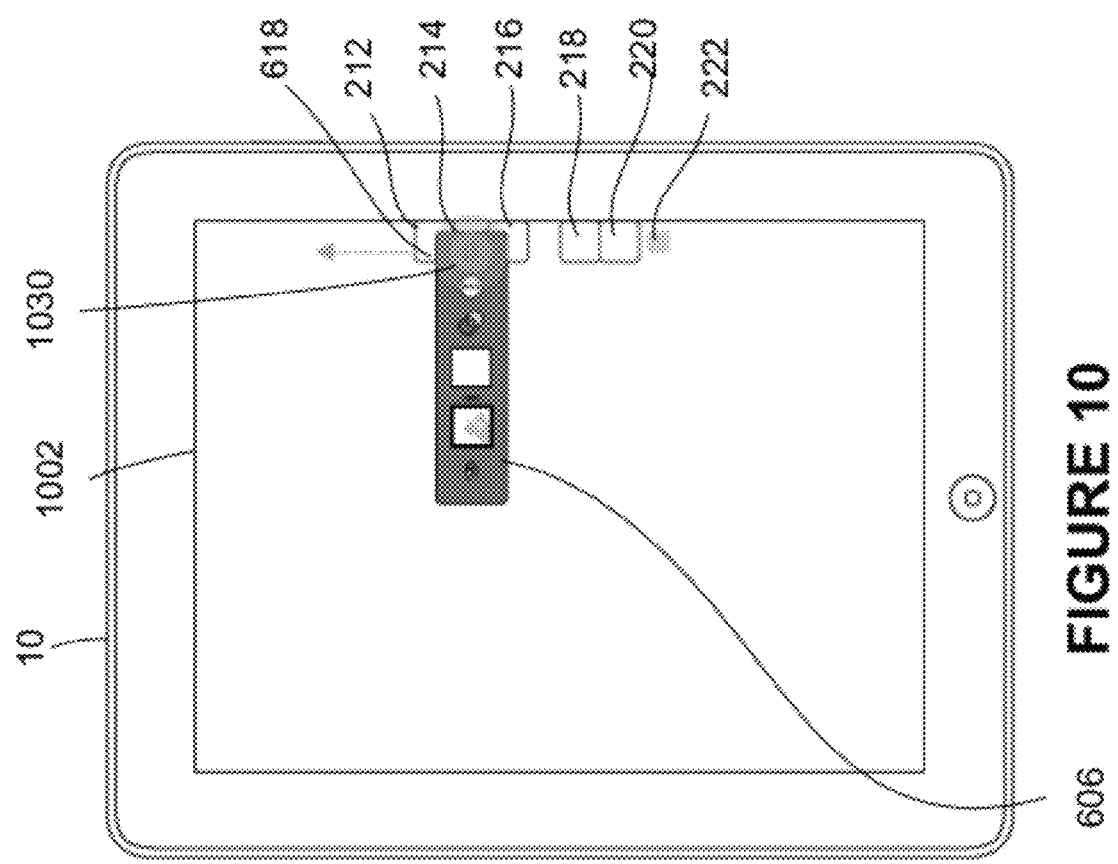
FIG. 10 illustrates a screen shot illustrating adjusting an expanded layer editing menu.

FIG. 10 illustrates a screen shot 1002 on exemplary device 10 illustrating adjusting an expanded layer editing menu 606. In this example, a drag 1030 on device 10 at the position of the gripper icon 618 is shown. In response, the expanded layer editing menu 606 is moved to a new position. While the expanded layer editing menu 606 is being moved it appears larger in size than when it is in a stationary position. In this example, adjusting an expanded layer editing menu 606 is controlled by a drag gesture. While such input is used in this example, other forms of touch-based and other types of input may alternatively or additionally be used.

Figure 11:
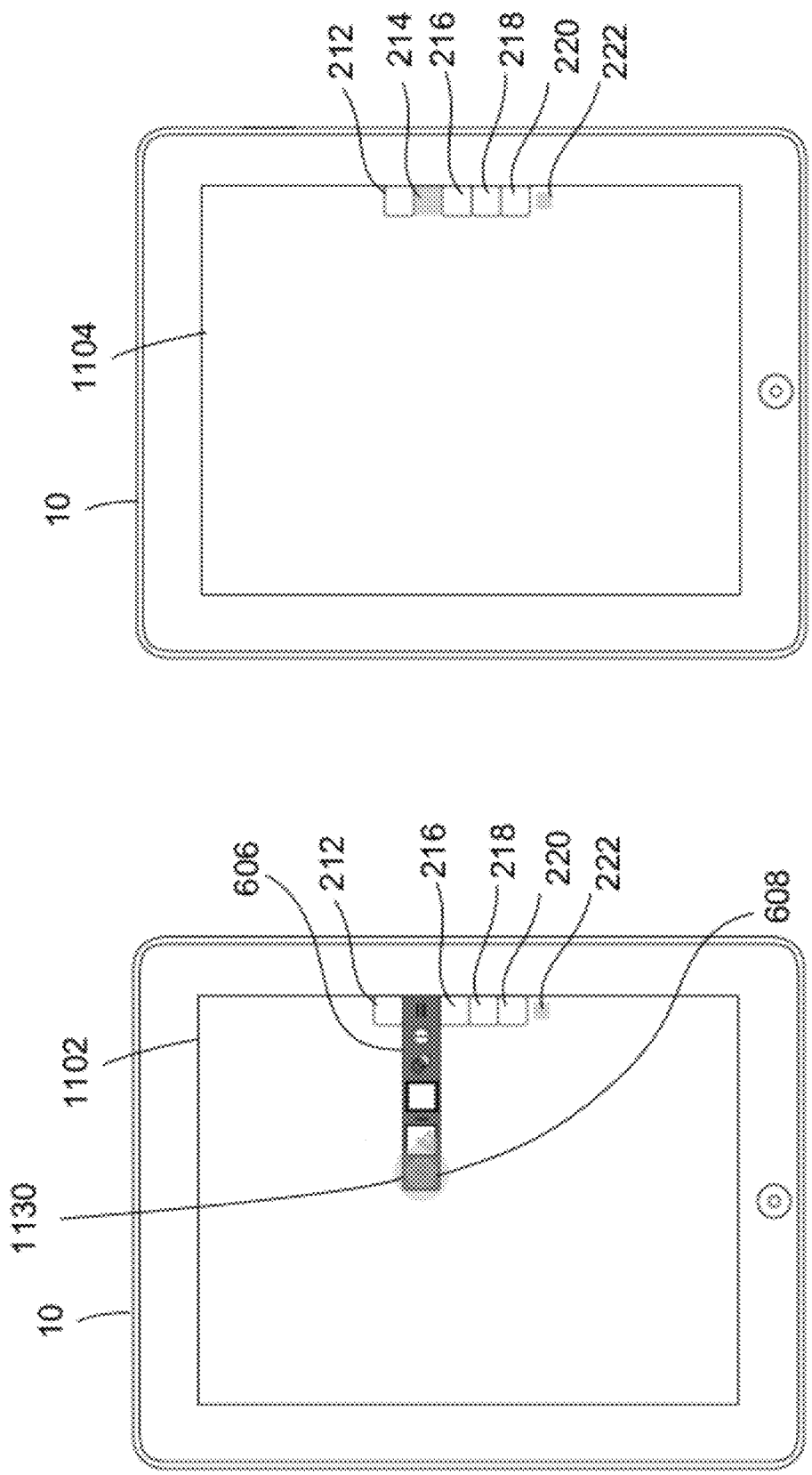
FIG. 11 illustrates a series of screen shots illustrating use of a visibility feature.

FIG. 11 illustrates a series of screen shots 1102, 1104 on exemplary device 10 illustrating use of a visibility feature. In this example, a single tap 1130 on device 10 at the position of the eyeball icon 608 is shown in screen shot 1102. In response, the representation 214 changes to indicate that the represented layer is collapsed and invisible. In this example, representation 214 is approximately the same size as a thumbnail image that would be used to represent that the image represented a layer that is being used. In this example, use of the visibility feature is controlled by a single tap gesture. While such input is used in this example, other forms of touch-based and other types of input may alternatively or additionally be used.

FIGS. 12A-E illustrates a series of screen shots 1202, 1204, 1206, 1208, 1210 on exemplary device 10 illustrating creation of a new photograph layer. In this example, a single long press 1230 on device 10 at the position of representation 216 is shown in screen shot 1202 of FIG. 12A. This results in an ADD A NEW LAYER menu 1214 as shown in screen shot 1204 of FIG. 12B. The representation 216 representing the layer being added is highlighted. In this example, a single tap 1232 on device 10 at the position of an ADD AN IMAGE LAYER option 1232 is shown. This results in a PHOTO ALBUM menu 1218 as shown in screen shot 1206 of FIG. 12C. A selection of a photo library option 1219 is received and a photo library menu 1220 is displayed as shown in screen shot 1208 of FIG. 12D. The exemplary PHOTO ALBUM menu 1218, photo library menu 1220, and other features may be accessed or otherwise provide by a separate application, operating system, or through a network. In the examples of FIGS. 12C and 12D, PHOTO ALBUM menu 1218 and photo library menu 1220 are illustratively accessed from an operating system. Generally, importing or placing a photo or other imported item can be facilitated using a photo library and associated photo management features that are provided by an operating system or separate application. Integration of user interface components from an operating system or separate application can facilitate the image editing process. In this example, a single tap 1234 on device 10 at the position of an photo icon 1222 in the photo library menu 1220 selects the associated photograph for use on the layer. The associated photograph is added to the layer, displayed as part of image 210, and used to provide representation 216 as a thumbnail that shows a small version of the photograph.

Using such a technique, a user is able to easily import a photograph into a layer of an image being created or editing on an image editing application. In one embodiment, the user is able to import such a photograph or otherwise populate a new layer regardless of whether layers above or below the recipient layer have been used. Representations 212, 214, 216, 218, 220, 222 thus both provide information about layer availability and layer use and may also provide access to specific layers in a layer order regardless of whether any of the other layers have yet been used. A user thus has the flexibility to populate and edit layers in whatever order best suits the user's purposes and style. The displayed representations 212, 214, 216, 218, 220, 222 further provide an indication of where within an order of multiple layers the layer with which a user is currently editing. This provides context that can help keep a user oriented and otherwise facilitate the user's use of multiple layers.

As an exemplary use case, a user may import a photograph and then on top of the photograph add layers to make a poster composition. As specific example, the user may tap to initiate populating a new layer, access a text tool from a tool pallet, and type in text on that layer. The user may then use the other available layers to add additional images and effects. As another exemplary use case, a user may import a photograph that includes a sports car on the bottommost layer, for example in layer 6, and than add a layer above, for example layer 5, to add a large white shape that would mask out the bottom part of that photograph below the sports car. In a layer above, for example in layer 4, the user may add text and artwork in positions around the sports car. Additional layers could additionally or alternatively to touchup up or adjust the appearance of the sports car, for example, by adding effects without damaging (destructively altering) the photograph. As another exemplary use case, a user may use multiple layers to create a web page design by using the different layers to create different modules or other components, such as, for example, web page buttons, icons, and menus. As another exemplary use case, a user may use multiple layers to create a multi-layer bitmap and/or vector graphics.

Figure 13:
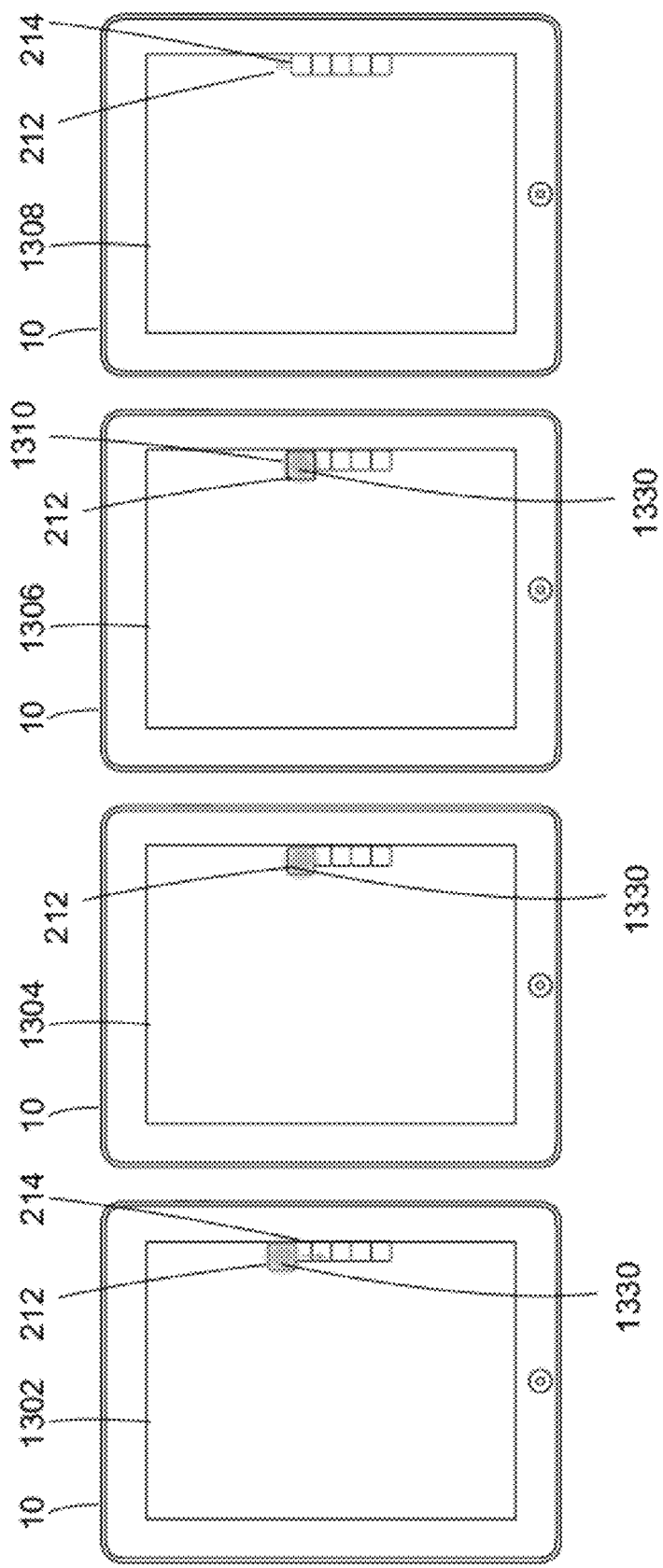
FIG. 13 illustrates a series of screen shots illustrating merging down a layer.

FIG. 13 illustrates a series of screen shots 1302, 1304, 1306, 1308 on exemplary device 10 illustrating merging down a layer. In this example, a drag 1330 on device 10 at the position of the representation 212 is shown in screen shots 1302, 1304, 1306. As the moving representation 212 is held over another representation, in the example representation 214, a merge indicator 1310 appears as shown in screen shot 1306 as a bolded square box surrounding the representation 212. The representations 212, 214 may alternatively or additionally enlarge and/or pulse. Upon release, the layers are merged together into representation 214 and representation 212 changes to indicate that the layer represented by representation 212 is no longer being used, as shown in screen shot 1308. Merging layers is generally a destructive act. In this example, merging down a layer is controlled by a drag gesture. While such input is used in this example, other forms of touch-based and other types of input may alternatively or additionally be used. Merging layers is used for various reasons. On devices that restrict the number of layers, for example to only allow use of six layers, merging of layers may be particularly desirable. Accordingly, simple to understand and use techniques for merging layers may be particularly useful on such devices.

Figure 14:
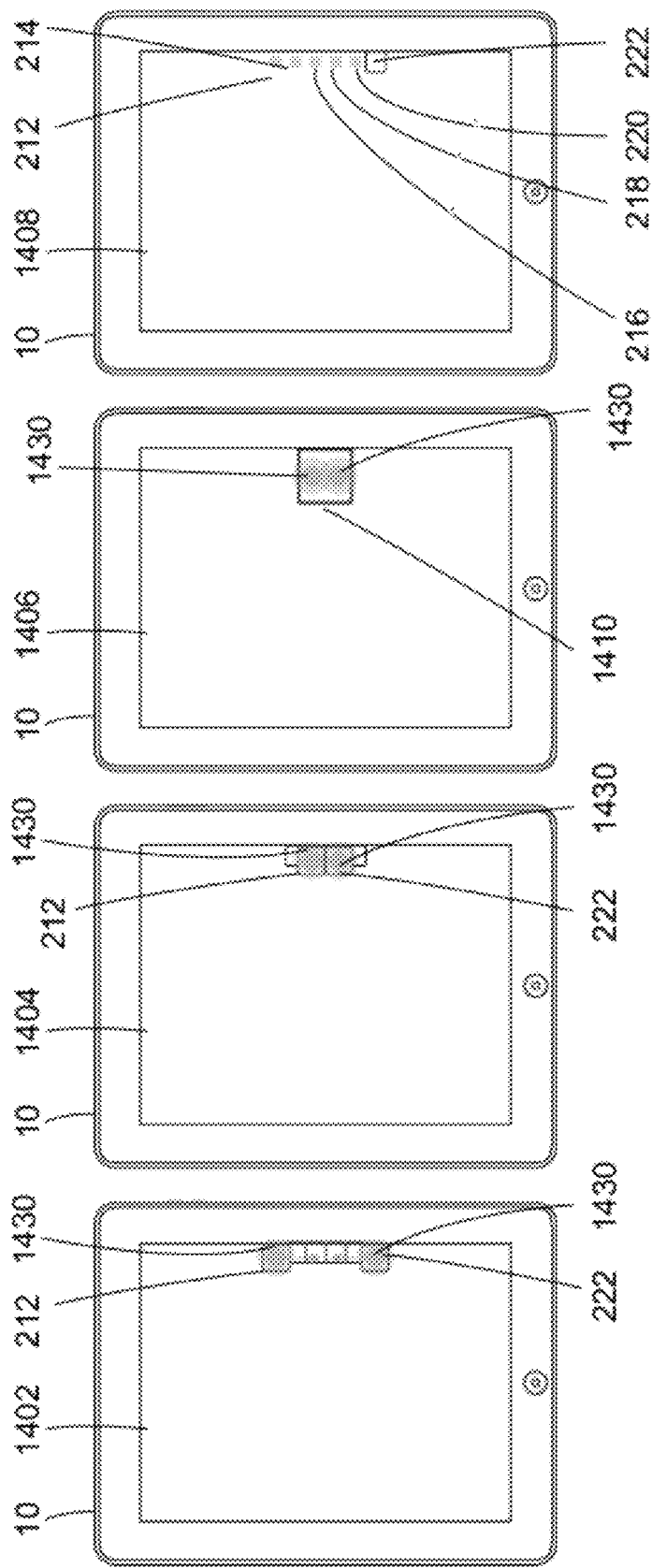
FIG. 14 illustrates a series of screen shots illustrating merging all layers.

FIG. 14 illustrates a series of screen shots 1402, 1404, 1406, 1408 on exemplary device 10 illustrating merging all layers. In this example, a pinch 1430 on device 10 between the position of the representations 212 and 222 is shown in screen shots 1402, 1404, 1406. As the top and bottom layer representation 212, 222 are held over in pinched together positions, a merge indicator 1410 appears as shown in screen shot 1406 as a bolded square box. Upon release, the layers are merged together into representation 222 and representations 212, 214, 216, 218, and 220 change to indicate that the layers represented by representation representations 212, 214, 216, 218, and 220 are no longer being used, as shown in screen shot 1408. In this example, merging layers is controlled by a pinching gesture. While such input is used in this example, other forms of touch-based and other types of input may alternatively or additionally be used.

On devices that restrict the number of layers, for example to only allow use of six layers, merging of all layers may be particularly desirable. In an exemplary use case, a user may create an image of a field of sunflowers using all of the available layers. Once the user is satisfied with the image of the field of sunflowers, the user can merge all the layers into a single layer and begin adding additional features on the freed up layers.

Figure 15:
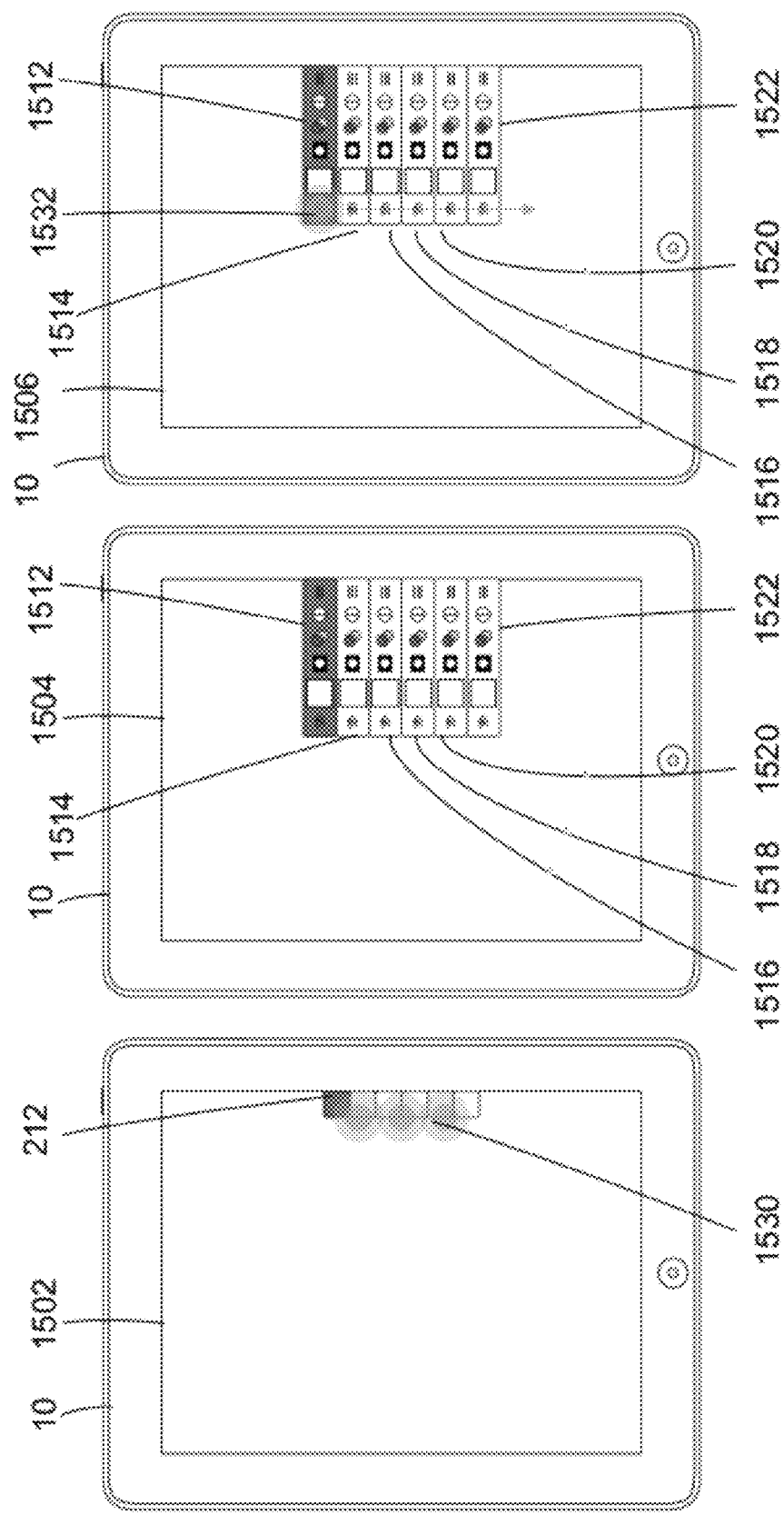
FIG. 15 illustrates a series of screen shots illustrating expanded menus for all layers.

FIG. 15 illustrates a series of screen shots 1502, 1504, 1506 on exemplary device 10 illustrating expanded menus for all layers. In this example, three finger tap 1530 on device 10 is shown in screen shot 1502. In response, expanded menus 1512, 1514, 1516, 1518, 1520, and 1522 for all layers are displayed, as shown in screen shot 1504. Prior to the three finger tap 1530 representation 212 is highlighted to indicate that it is selected. After the three finger tap 1530, the corresponding expanded menu, expanded menu 1512 is highlighted to indicate that it is selected. In this example, a drag 1532 on device 10 is shown in screen shot 1502 in screen shot 1506. The drag 1532 causes the visibility of all layers to be turned off because the drag swipes across eyeball indicators of the expanded menus 1512, 1514, 1516, 1518, 1520 of all of the layers. This provides an example of a drag input used to easily control effects for multiple layers. In this example, three finger and drag gesture are illustrated. While such inputs are used in this example, other forms of touch-based and other types of input may alternatively or additionally be used. Generally, a user may expanded menus for multiple or all layers for various reasons. For example, a user may want to do a significant amount of layer management and can simplify such management by adjusting multiple layer expanded properties at once.

Figure 16:
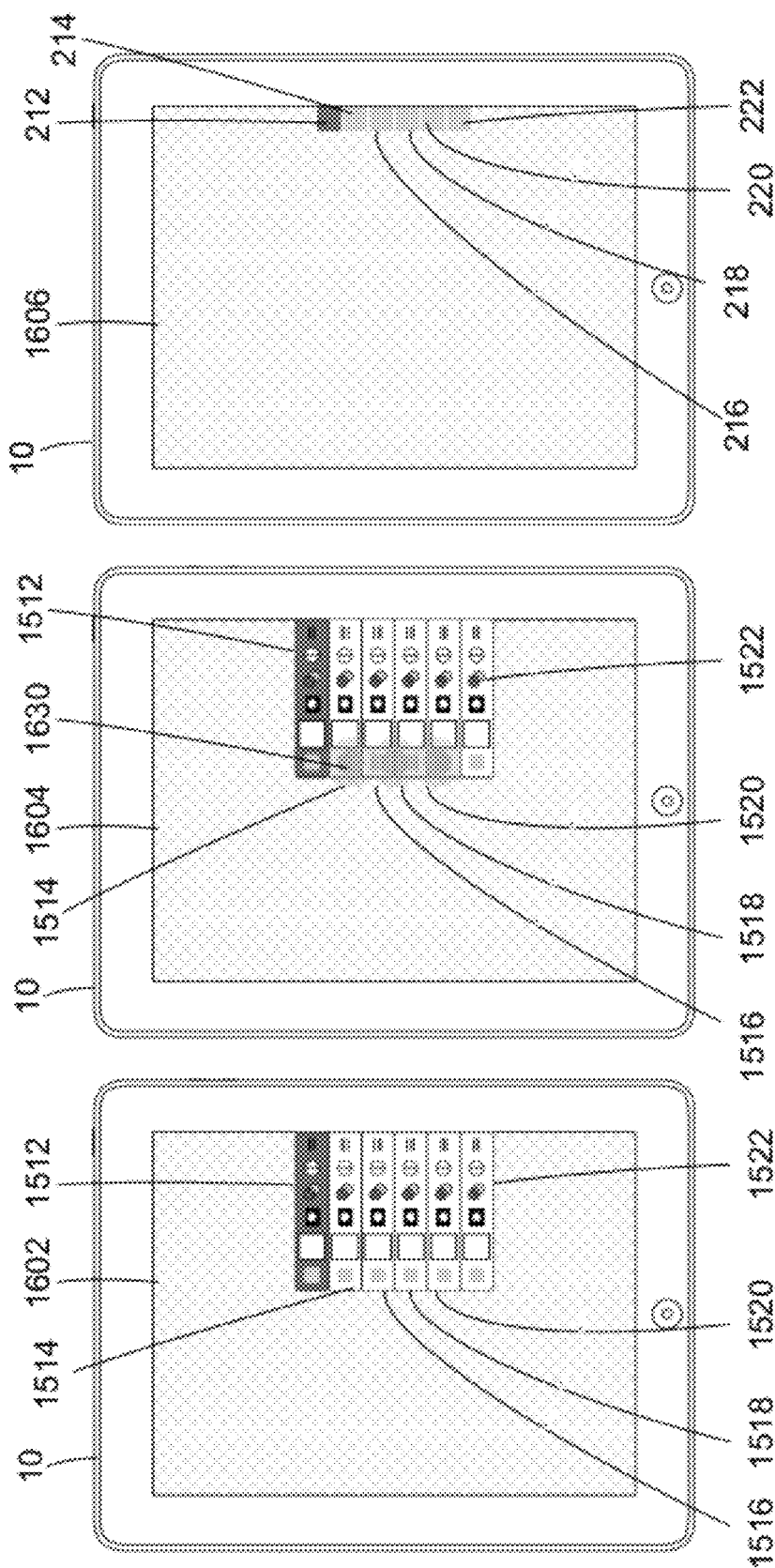
FIG. 16 illustrates a series of screen shots illustrating collapsing expanded menus for all layers.

FIG. 16 illustrates a series of screen shots 1602, 1604, 1606 on exemplary device 10 illustrating collapsing menus for all layers. In this example, three finger tap 1630 on device 10 is shown in screen shot 1604. In response, expanded menus 1512, 1514, 1516, 1518, 1520, and 1522 for all layers are collapsed, as shown in screen shot 1606. Prior to the three finger tap 1630, expanded menu 1512 is highlighted to indicate that it is selected. After the three finger tap 1630, representation 212 corresponding to the same layer is highlighted to indicate that it is selected. In this example, a three finger tap gesture is illustrated. While such input is used in this example, other forms of touch-based and other types of input may alternatively or additionally be used.

Figure 17:
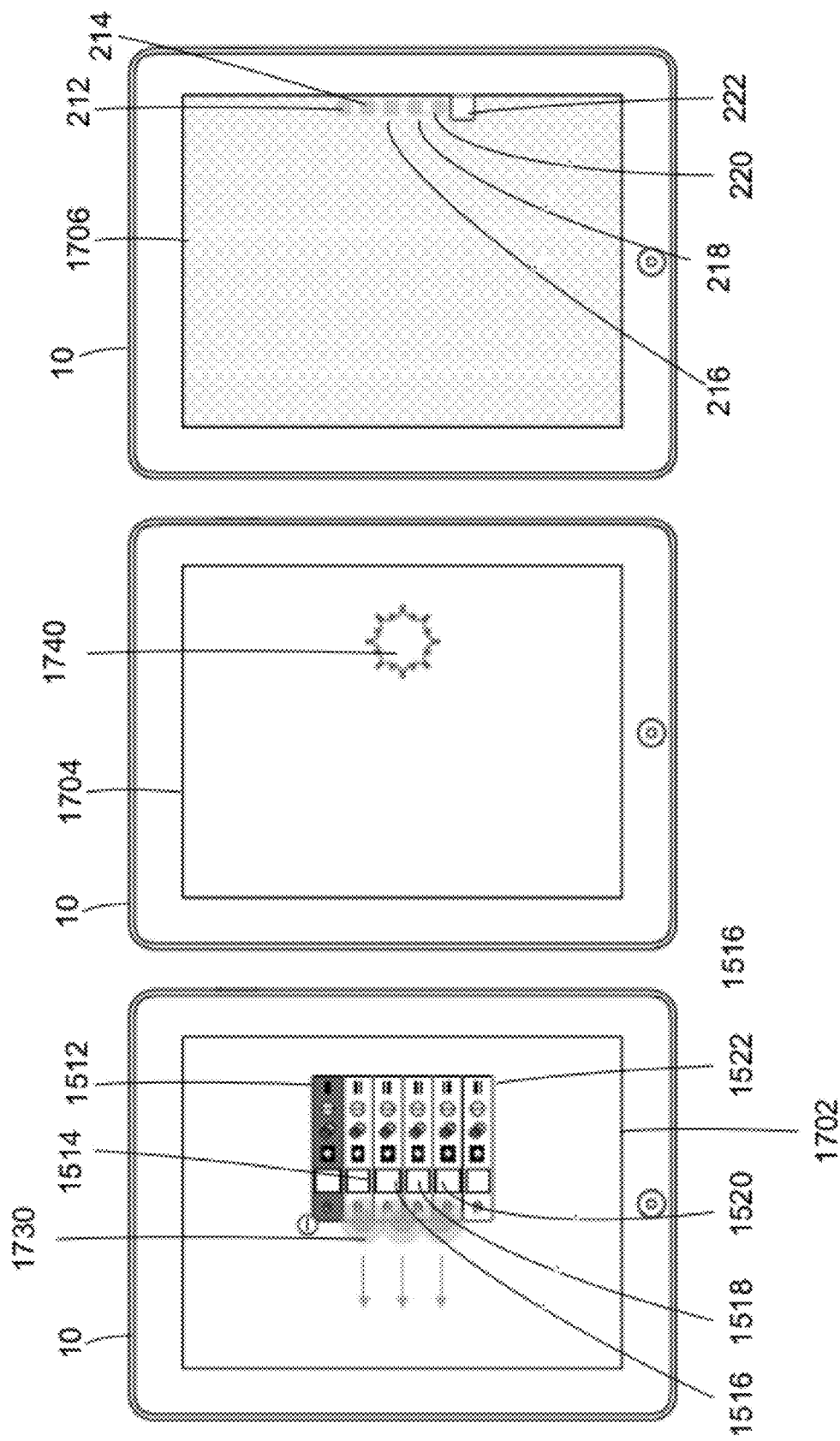
FIG. 17 illustrates a series of screen shots illustrating deleting all layers.

FIG. 17 illustrates a series of screen shots 1702, 1704, 1706 on exemplary device 10 illustrating deleting all layers. Expanded menus 1512, 1514, 1516, 1518, 1520, and 1522 are displayed in screen shot 1702. In this example, three finger drag 1730 on device 10 is shown. In response, deletion indicator 1740 is displayed, as shown in screen shot 1704 and the layers are deleted. In this example, after the deletion, representations 212, 214, 216, 218, 220 indicate that the represented layers are not being used and representation 222 indicates that the represented layer is being used but does not include any image or image effects. In this example, a three finger drag gesture is illustrated. While such input is used in this example, other forms of touch-based and other types of input may alternatively or additionally be used.

Figure 18:
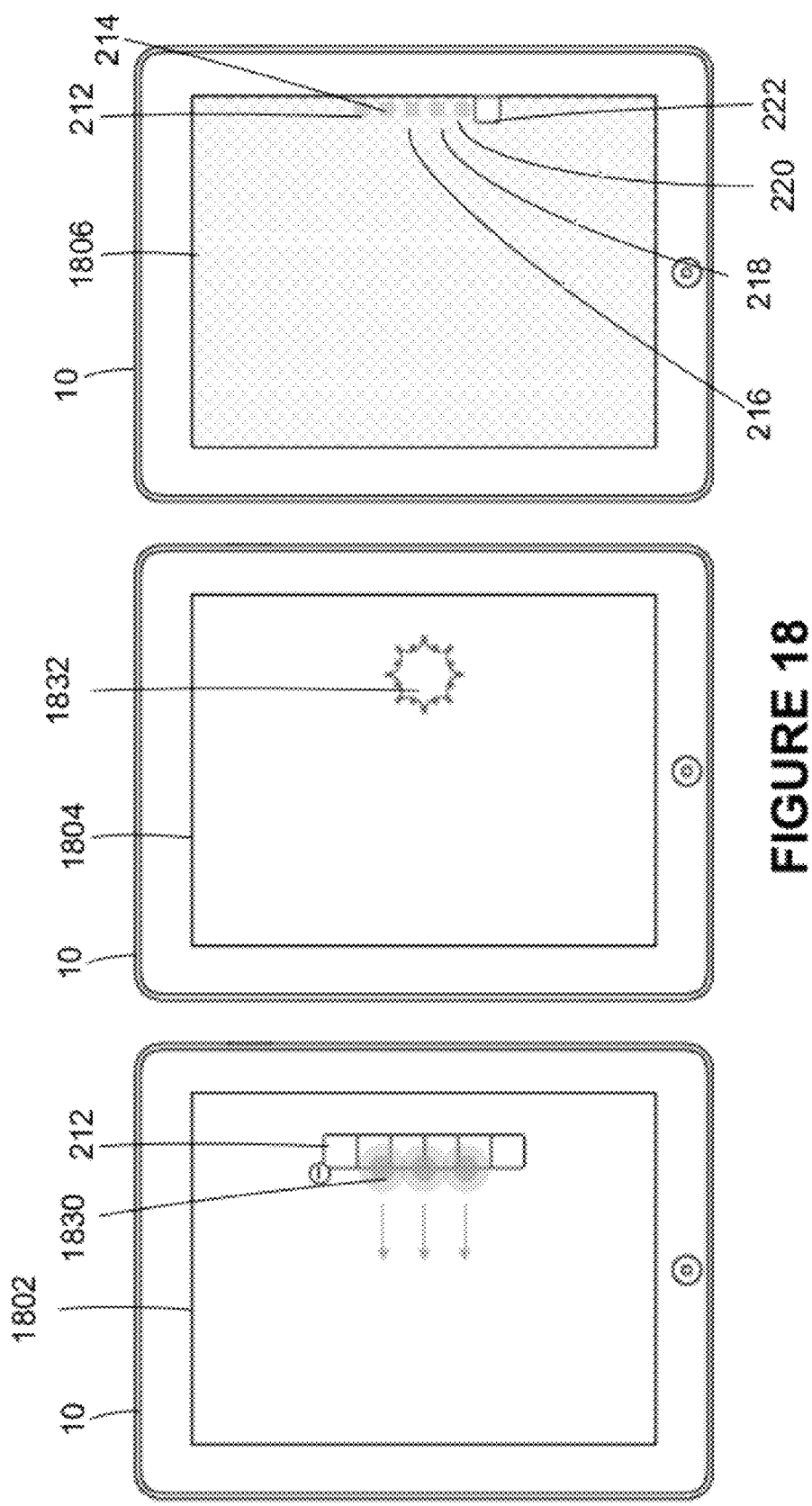
FIG. 18 illustrates a series of screen shots illustrating deleting all layers in another context.

Deletion of multiple layers can similarly be controlled by similar input, for example, three finger drag away input, relative to representations 212, 214, 216, 218, 220, 220 displayed in a stack of layer representations. FIG. 18 illustrates a series of screen shots 1802, 1804, 1806 on exemplary device 10 illustrating deleting all layers in another context. Expanded menus 1512, 1514, 1516, 1518, 1520, and 1522 are displayed in screen shot 1702. In this example, three finger drag 1830 on device 10 is shown. In response, deletion indicator 1840 is displayed, as shown in screen shot 1804 and the layers are deleted. In this example, after the deletion, representations 212, 214, 216, 218, 220 indicate that the represented layers are not being used and representation 222 indicates that the represented layer is being used but does not include any image or image effects. In this example, a three finger drag gesture is illustrated. While such input is used in this example, other forms of touch-based and other types of input may alternatively or additionally be used. Using similar input gestures to control similar commands in different contexts can make a user interface more intuitive and easier to learn and use.

Figure 19:
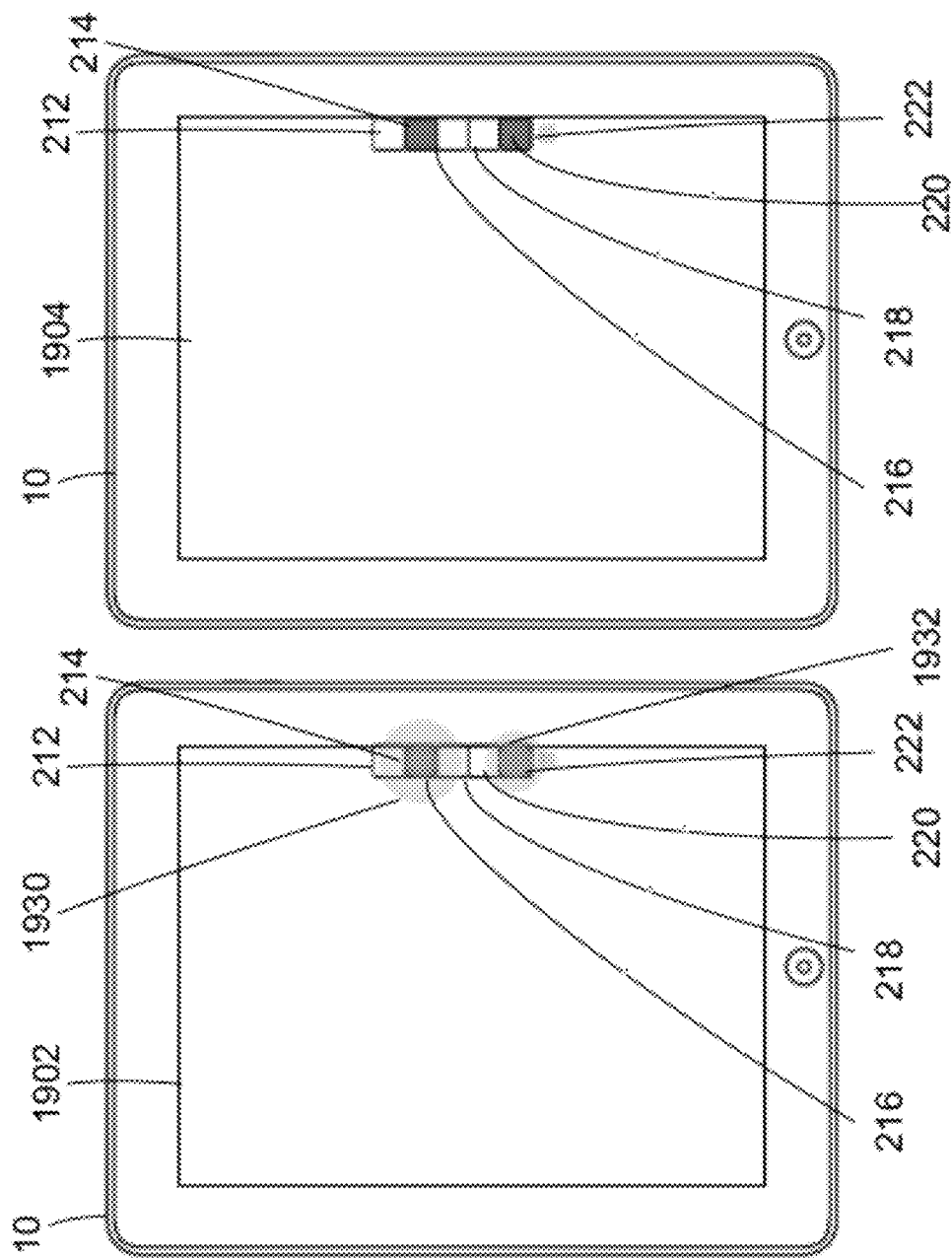
FIG. 19 illustrates a series of screen shots illustrating selection of multiple layers.

FIG. 19 illustrates a series of screen shots 1902, 1904 on exemplary device 10 illustrating selection of multiple layers. In this example, a tap and hold 1930 followed by another tap 1932 on device 10 is shown on screen shot 1902. This results in selection of multiple representations 214, 220 together. In this example, a tap and hold followed by another tap is illustrated. While such input is used in this example, other forms of touch-based and other types of input may alternatively or additionally be used.

Figure 20:
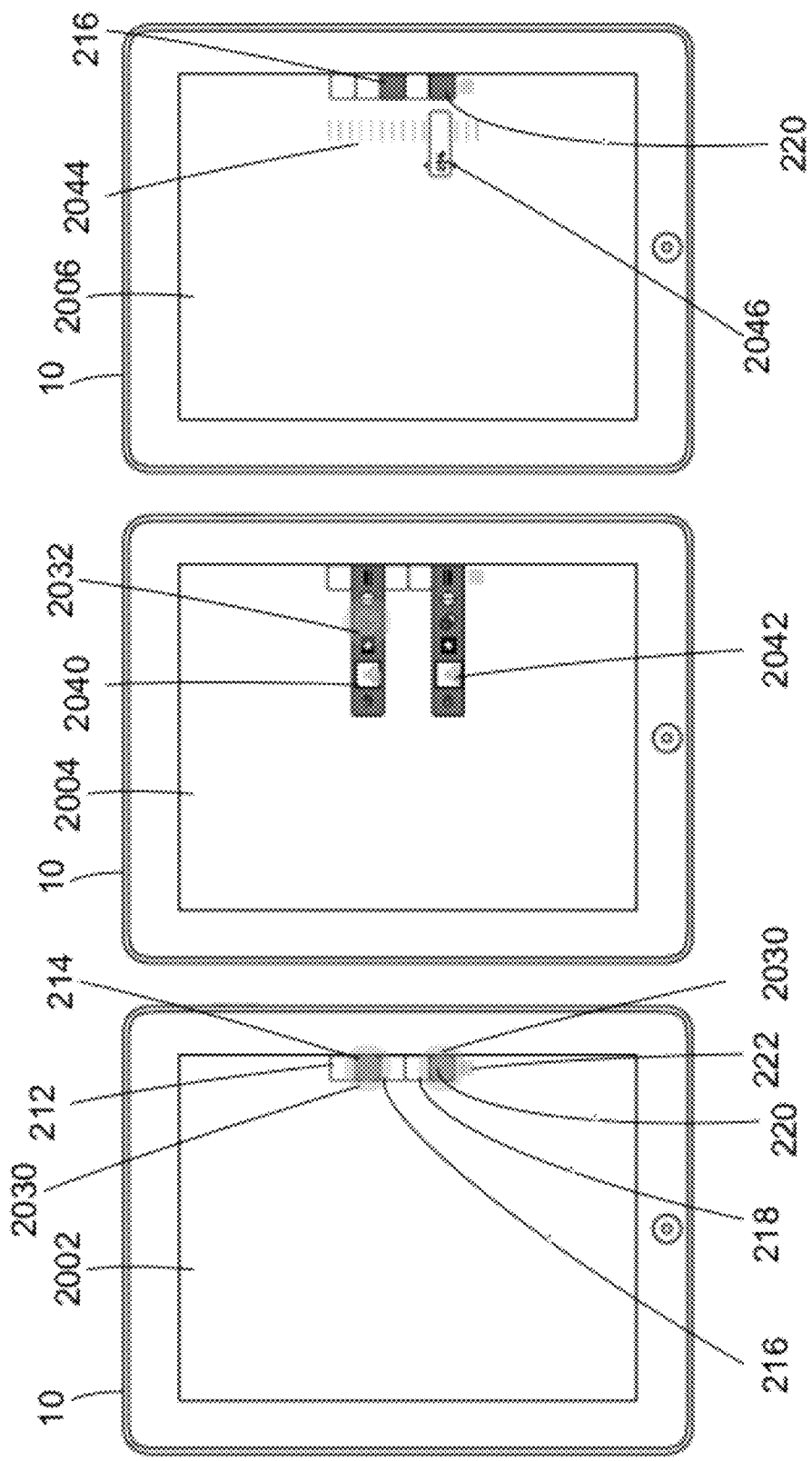
FIG. 20 illustrates a series of screen shots illustrating adjustment of properties of multiple layers.

FIG. 20 illustrates a series of screen shots 2002, 2004, 2006 on exemplary device 10 illustrating adjustment of properties of multiple layers. In this example, a tap 2030 on selected representations 212, 220 on device 10 is shown on screen shot 2002. This results in expanded menus 2040, 2042 being displayed as shown on screen shot 2004. In this example, a single tap 2032 on an opacity icon of an expanded menu 2040 results in the display of an opacity scale 2044 with an opacity adjustment slider 2046 as shown in screen shot 2006 for adjusting opacity for both of the layers associated with the expanded menus 2040, 2042. The input is used in this example for illustrative purposes and other forms of touch-based and other types of input may alternatively or additionally be used.

Figure 21:
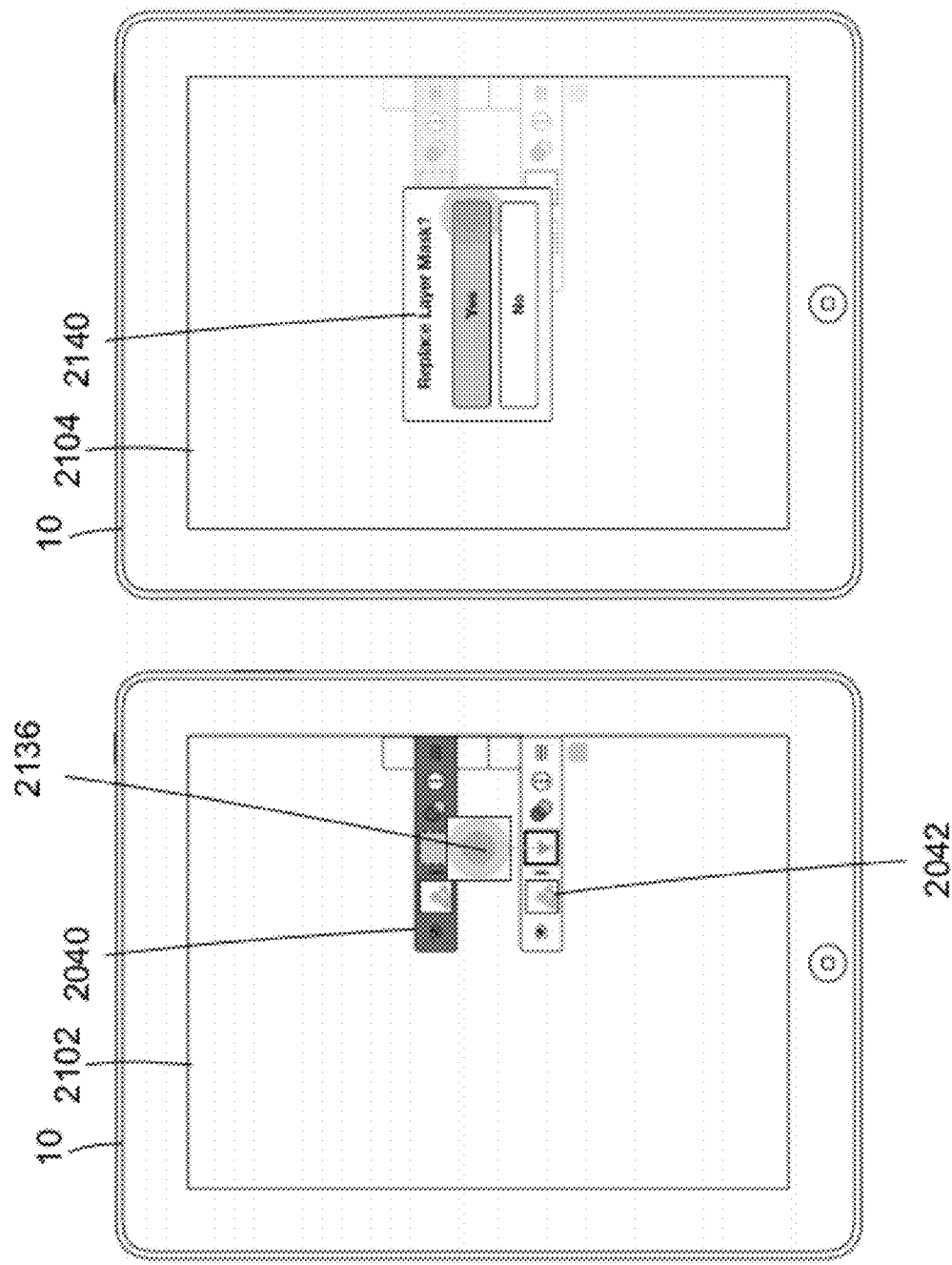
FIG. 21 illustrates a series of screen shots illustrating another adjustment of properties of multiple layers.

FIG. 21 illustrates a series of screen shots 2102, 2104 on exemplary device 10 illustrating another adjustment of properties of multiple layers. In this example expanded menus 2040, 2042 are displayed in screen shot 2202. In this example, a drag 2130 from expanded menu 2040 to expanded menu 2042 is received on device 10. This results in menu 2140 asking whether to replace the layer mask of the layer associated with expanded menu 2042 with the layer mask of the layer associated with expanded menu 2040 as shown on screen shot 2104. The input is used in this example for illustrative purposes and other forms of touch-based and other types of input may alternatively or additionally be used. Input can be used generally to provide simple mechanisms for copying and/or moving features or attributes between different layers.

Figure 22:
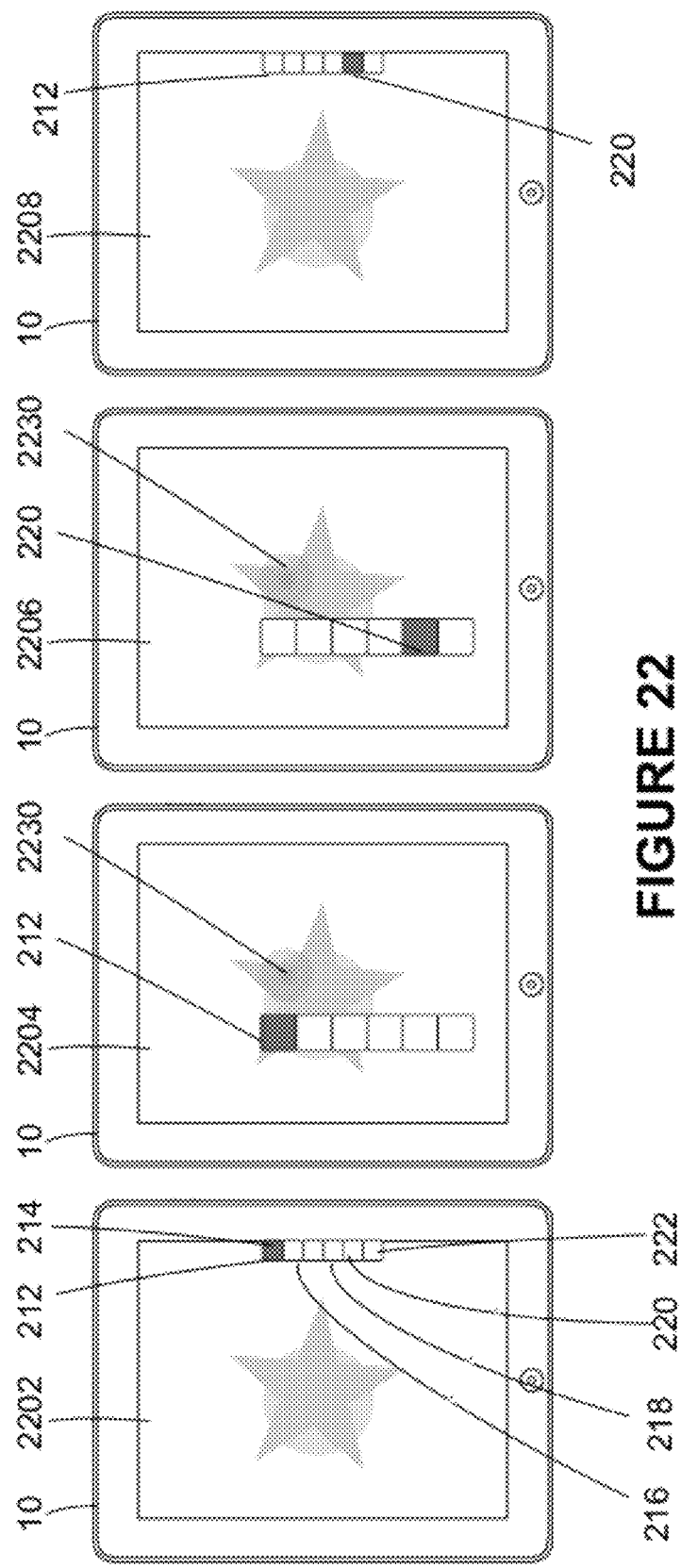
FIG. 22 illustrates a series of screen shots illustrating finding a layer.

FIG. 22 illustrates a series of screen shots 2202, 2204, 2206, 2208 on exemplary device 10 illustrating finding a layer. In this example a tap and hold input 2230 is received as shown in screen shots 2204, 2206. As the user continues to hold, a selection indicator such as highlighting cycles through the representations 212, 214, 216, 218, 220, 222 shown as expanded during the cycling in screen shots 2204, 2206. In this example, the selection indicator highlights a selected representation one after another. In screen shot 2204 representation 212 is highlighted. In screen shot 2206 representation 220 is highlighted. When the user release, as shown in screen shot 2208, the representation selected at the time of release, in this example representation 220, remains selected. In this example, a long press invokes an enlarged layer finder which automatically cycles from a top-most layer down. The cycle can loop until the user releases the input or otherwise provides input to stop the cycling. The input is used in this example for illustrative purposes and other forms of touch-based and other types of input may alternatively or additionally be used.

Figure 23:
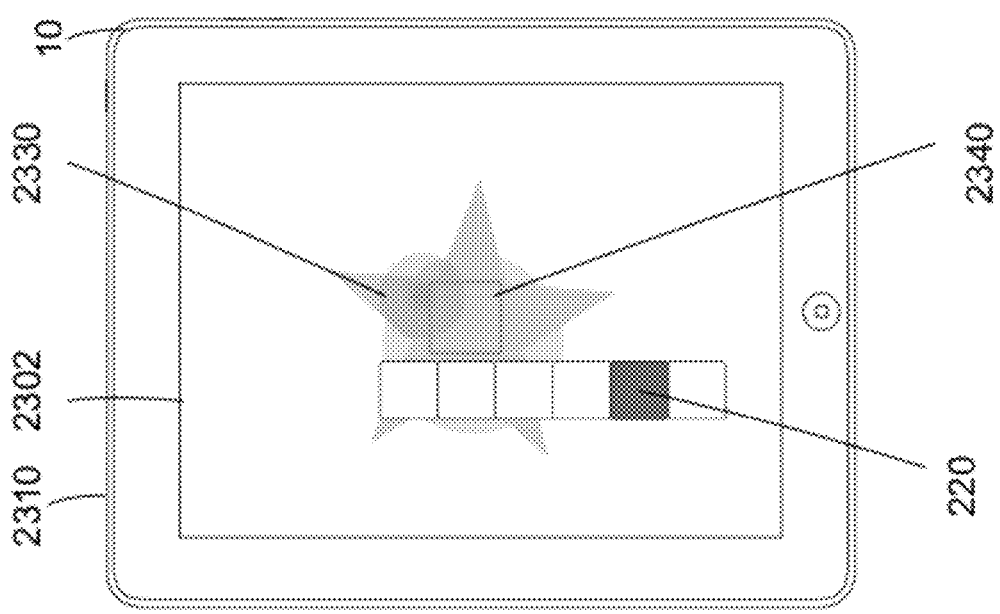
FIG. 23 illustrates an exemplary screen shot in which layer specific objects are distinguished during a layer finding process.

Various techniques can be used to address the sometimes difficult task of identifying and selecting a particular layer. Oftentimes, objects can be hidden, for example, several layers below something in a higher layer and therefore difficult to identify, select, and edit. FIG. 23 illustrates an exemplary screen shot 2302 on exemplary device 10 in which specific objects are distinguished during a layer finding process. In this example, automatic cycling of layers is initiated by tap and hold input 2330, during which objects associated with the layer currently focused upon in such a cycle are distinguished with an indicator 2340. An exemplary automatic cycle may focus on individual layers for a predetermined period of time, such as a half second. As the automatic cycle focuses on the different states, an outline or other shape representation may be displayed to indicate the presence of an object in the currently-focused layer. The input is used in these examples for illustrative purposes and other forms of touch-based and other types of input may alternatively or additionally be used.

Figure 24:
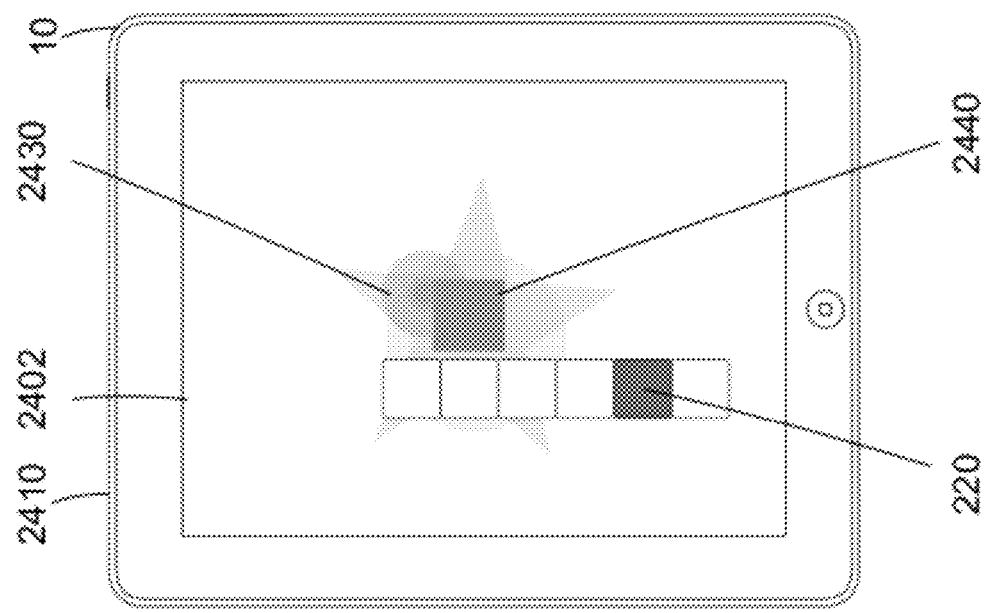
FIG. 24 illustrates an exemplary screen shot in which specific objects are distinguished during a layer finding process in an alternative way.

FIG. 24 illustrates an exemplary screen shot 2402 on exemplary device 10 in which specific objects are distinguished during a layer finding process in an alternative way. In this example, automatic cycling of layers is initiated by tap and hold input 2430, during which objects associated with the layer currently focused upon in such a cycle such as object 2440 are distinguished from objects not associated with the layer currently focused upon by adjusting the opacity associated with the other layers during the automatic cycle. The opacity can be reduced so that the objects associated with the layer currently focused upon are visible and/or distinguishable. The input is used in these examples for illustrative purposes and other forms of touch-based and other types of input may alternatively or additionally be used.

Figure 25:
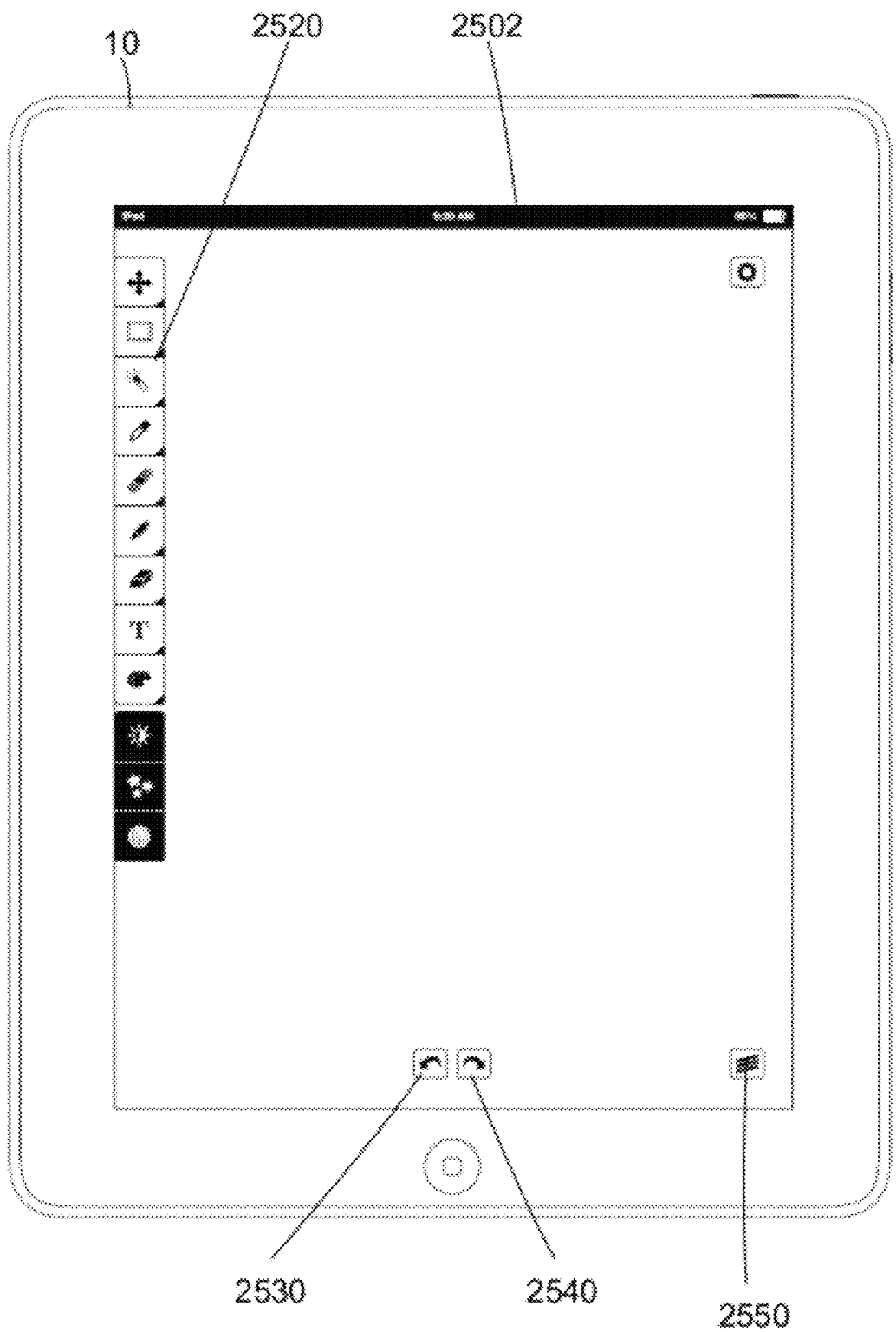
FIG. 25 illustrates an exemplary user interface of a digital image editing software application.

FIG. 25 illustrates an exemplary user interface 2502 of an editing software application executing on device 10. The user interface 2502 comprises a tool menu 2520 providing various tools for editing electronic content, an undo button 2530, a redo button 2540, and a layers icon 2550 for accessing layer representations, such as layer representations 212, 214, 216, 218, 220, and 222 of FIG. 2. Invoking layers icon 2550 may or may not cause other user interface 2502 features, such as tool menu 2520, undo button 2530, and redo button 2540, to be hidden. In one embodiment, a user invokes layers icon 2550, selects a layer, and returns to the main workspace of user interface 2502.

FIG. 26 is a flow chart illustrating an exemplary method 2600 of providing an editing feature for editing a layer of electronic content. Exemplary method 2600 may be implemented by a variety of devices including, but not limited to, device 10 shown in FIG. 1. In implemented on a device such as device 10 of FIG. 1, features of exemplary method 2600 may be performed by editing application 13, for example, by one or both of modules 21 and 22.

Exemplary method 2600 comprises displaying a graphical user interface for editing a electronic content, as shown in block 2610 and displaying representations of a fixed number of layers available for use in the electronic content, as shown in block 2620. Representation of ones of the layers that are not used are graphically distinguished from representations of ones of the layers that are used. Each representation of the ones of the layers that are used may display only a selectable thumbnail image representative of a corresponding layer of the electronic content. Each representation of the ones of the layers that are not used may display a selectable indicator indicating that a respective layer is not used. Relative positions of the representations of the fixed number of layers may be used to indicate an order. For example, a representation of a first layer positioned above a representation of a second layer may indicate that the first layer is above the second layer in the electronic content.

Exemplary method 2600 further comprises, in response to receiving input at the computer device, providing an editing feature for editing a layer of the electronic content, as shown in block 2630. The input may comprise a touch-based input received on a touch-screen display of a computer device that is used to display the representations of the fixed number of layers. Such touch-based input may select a first representation representing a first layer of the layers that is not used, and, in response to receiving the input, the first representation may be changes to indicate that the first layer is now used. Similarly, the touch-based input may select a first representation representing a first layer of the layers that is used and delete the first layer, and, in response to receiving the input, the first representation may be changed to indicate that the first layer is not used.

In another example, the touch-based input may comprises a gesture that selects a first representation representing a first layer and moves it to a new location relative to a second representation of a second layer such that there is a changed order of the representations displayed. In response to receiving the input, an order of the layers of the electronic content may be changed based on the changed order of the representations.

In another example, the touch-based input comprises a gesture that selects a first representation representing a first layer and moves it to a new location relative to a second representation of a second layer. In response to receiving the input the first layer may be merged into the second layer and the first representation changes to indicate that the first layer is not used. Similarly, in another example, the touch-based input comprises a gesture that selects three or more representations to merge. In response to receiving the input, the three or more layers may be merged in to a single layer represented by a single one of the representations. Such a gesture may result in merging of all of the layers of a piece of electronic content.

In one exemplary embodiment, the exemplary method 2600 further comprises displaying one or more expanded layer options. For example, the touch-based input may be received as a gesture that selects a first representation representing a first layer for expanded option presentation. In response to receiving the input a menu of expanded layer options may be displayed. Menus of expanded layer options may be displayed simultaneously for multiple layers.

In one exemplary embodiment, an editing feature is provided that comprises a feature for identifying a layer. When input is received, an indicator may cycle through selecting individual ones of the representations to allow easy selection of a desired layer. In a specific example, while a first representation of a layer is selected as such an indicator cycles through multiple representations, a feature of a corresponding layer represented by the first representation may be highlighted or otherwise distinguished.

In one exemplary embodiment, the number of layers used by a software application is fixed based on a type of the computing device upon which the software application has been installed. For example, on a second computing device of a different type, the software application may be installed to use a different fixed number of layers or even to allow use of an unlimited number of layers. A same set of layer constructions may be used to provide the software application multiple computer devices with differing numbers of layers. Such constructs may be the same across multiple devices, brands, domains, and platforms. Accordingly, a single layer user interface system can be used on photograph editing applications, drawing applications, text layout applications, and any other applications that utilize layering regardless of the features of the applications, the devices upon which the applications are used, and other variables.

The use of layers in a particular context may be tailored as appropriate at installation, after installation, based on user settings, or otherwise. For example, a relatively small number of layers could be used on phones, tablets, laptops, desktops, and other electronic devices having relatively small displays or otherwise limited resources. On devices with larger displays and/or less limited resources, additional states may be allowed, preferably through a user interface that has a similar look and feel regardless of the number of layers allowed. If more layers are available on different applications or contexts, the additional layers can be represented by additional representations in a larger stack of layer representations. Access to additional layer representations may be provided through a scroll bar or other feature if necessary to allow access to additional layers. In one example, default layers are represented within minimal representations but a user can adjust settings to have expanded representations, layer naming, and other details.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
    displaying, on a computer device, a graphical user interface for editing electronic content: displaying, on the computer device, representations of a fixed number of layers available for separately editing different aspects of an image of the electronic content, wherein:
    the fixed number of layers is fixed based on a type of the computing device upon which a software application providing the graphical user interface has been installed, wherein, when the software application is installed on a second computing device of a different type, the fixed number of layers is different, wherein a same set of layer constructions is used to provide the software application on the computer device and the second computer device, and
    displaying representations of the fixed number of layers including both representations of layers that are populated with content and layers that are not populated with content indicates a maximum number of layers available for separately editing the different aspects of the image by editing individual layers of the image using the graphical user interface, wherein representations of layers that are not populated with content are graphically distinguished from representations of layers that are populated with content; and
    in response to receiving input at the computer device, providing an editing feature for editing a layer of the electronic content.

2. The method of claim 1 wherein:
    each of the layers that are populated with content is represented only by an unlabeled selectable thumbnail image representative of a corresponding layer of the electronic content; and
    each of the layers that are not populated with content is represented only by an unlabeled selectable indicator indicating that a respective layer is not populated with content.

3. The method of claim 1 wherein relative positions of the representations of the fixed number of layers indicate an order, wherein a representation of a first layer positioned above a representation of a second layer indicates that the first layer is above the second layer in the electronic content.

4. The method of claim 1 wherein the input comprises a touch-based input received on a touch-screen display of the computer device, the touch screen display displaying the representations of the fixed number of layers.

5. The method of claim 4 wherein the touch-based input selects a first representation representing a first layer of the layers that is not populated with content, wherein in response to receiving the input, the first representation changes to indicate that the first layer is populated with content.

6. The method of claim 4 wherein the touch-based input selects a first representation representing a first layer of the layers that is populated with content and deletes the first layer, wherein in response to receiving the input, the first representation changes to indicate that the first layer is not populated with content.

7. The method of claim 4 wherein the touch-based input comprises a gesture that selects a first representation representing a first layer and moves it to a new location relative to a second representation of a second layer such that there is a changed order of the representations displayed, wherein in response to receiving the input, an order of the layers of the electronic content is changed based on the changed order of the representations.

8. The method of claim 4 wherein the touch-based input comprises a gesture that selects a first representation representing a first layer and moves it to a new location relative to a second representation of a second layer, wherein in response to receiving the input:
the first layer is merged into the second layer; and
the first representation changes to indicate that the first layer is not populated with content.

9. The method of claim 4 wherein the touch-based input comprises a gesture that selects three or more representations to merge, wherein in response to receiving the input the three or more layers are merged in to a single layer represented by a single one of the representations.

10. The method of claim 9 wherein the gesture results in merging of all of the layers of the electronic content.

11. The method of claim 4 wherein the touch-based input comprises a gesture that selects a first representation representing a first layer, wherein in response to receiving the input a menu of expanded layer options is displayed.

12. The method of claim 4 wherein menus of expanded layer options are displayed simultaneously for multiple layers.

13. The method of claim 1 wherein a representation of a first layer that is populated with content displays only a portion of the first layer, wherein a transparent portion of the first layer is not displayed as part of the representation of the first layer.

14. The method of claim 1 further comprising indicating which of the layers is currently being edited separate from indicating whether each layer is populated with content.

15. A system comprising:
a touch screen; and
a processor for executing instructions stored in computer-readable medium on one or more devices, wherein when executed by the processor, the instructions perform operations comprising:
displaying a graphical user interface for editing electronic content;
displaying, on the computer device, representations of a fixed number of layers available for separately editing different aspects of an image of the electronic content, wherein:
the fixed number of layers is fixed based on a type of the computing device upon which a software application providing the graphical user interface has been installed, wherein, when the software application is installed on a second computing device of a different type, the fixed number of layers is different, wherein a same set of layer constructions is used to provide the software application on the computer device and the second computer device, and
displaying representations of the fixed number of layers including both representations of layers that are populated with content and layers that are not populated with content indicates a maximum number of layers available for separately editing the different aspects of the image by editing individual layers of the image using the graphical user interface, wherein representations of layers that are not populated with content are graphically distinguished from representations of layers that are populated with content; and
in response to receiving input at the computer device, providing an editing feature for editing a layer of the electronic content.

16. The system of claim 15 wherein relative positions of the representations of the fixed number of layers indicate an order, wherein a representation of a first layer positioned above a representation of a second layer indicates that the first layer is above the second layer in the electronic content.

17. The system of claim 15 wherein the operations further comprise receiving touch-based input as a gesture that selects a first representation representing a first layer and moves the first representation to a new location relative to a second representation of a second layer; and
in response to receiving the input,
merging image aspects of the first layer into the second layer; and
changing the first representation to indicate that the first layer is not populated with content.

18. The system of claim 15 wherein a diagonally-measured screen size of the touch screen is within a range of 5 inches to 9 inches, inclusive.

19. A non-transitory computer-readable medium on which is encoded program code, the program code comprising:
program code for displaying, on a computer device, a graphical user interface for editing electronic content;
program code for displaying, on the computer device, representations of a fixed number of layers available for separately editing different aspects of an image of the electronic content, wherein:
the fixed number of layers is fixed based on a type of the computing device upon which a software application providing the graphical user interface has been installed, wherein, when the software application is installed on a second computing device of a different type, the fixed number of layers is different, wherein a same set of layer constructions is used to provide the software application on the computer device and the second computer device, and
displaying representations of the fixed number of layers including both representations of layers that are populated with content and layers that are not populated with content indicates a maximum number of layers available to a user for separately editing the different aspects of the image by editing individual layers of the image using the graphical user interface, wherein representations of layers that are not populated with content are graphically distinguished from representations of layers that are populated with content; and
program code for, in response to receiving input at the computer device, providing an editing feature for editing a layer of the electronic content.

* * * * *